(12) United States Patent
Adachi et al.

(10) Patent No.: US 9,067,380 B2
(45) Date of Patent: Jun. 30, 2015

(54) COMPOSITE LAMINATE CERAMIC ELECTRONIC COMPONENT

(71) Applicant: MURATA MANUFACTURING CO., LTD., Nagaokakyo-Shi, Kyoto-fu (JP)

(72) Inventors: Hiroshige Adachi, Nagaokakyo (JP); Kazuhiro Kaneko, Nagaokakyo (JP); Sadaaki Sakamoto, Nagaokakyo (JP); Satoru Adachi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 57 days.

(21) Appl. No.: 14/067,286

(22) Filed: Oct. 30, 2013

(65) Prior Publication Data
US 2014/0057087 A1 Feb. 27, 2014

Related U.S. Application Data

(63) Continuation of application No. PCT/JP2012/053260, filed on Feb. 13, 2012.

(30) Foreign Application Priority Data

May 19, 2011 (JP) .................................. 2011-112127

(51) Int. Cl.
*B32B 7/02* (2006.01)
*H01G 4/30* (2006.01)
(Continued)

(52) U.S. Cl.
CPC ........... *B32B 7/02* (2013.01); *Y10T 428/24942* (2015.01); *H01G 4/30* (2013.01);
(Continued)

(58) Field of Classification Search
CPC ............................ C04B 2235/3262–2235/3268
See application file for complete search history.

(56) References Cited

U.S. PATENT DOCUMENTS 6,195,250 B1 * 2/2001 Matoba et al. ............. 361/321.5
6,846,767 B2 * 1/2005 Kim et al. ..................... 501/136
(Continued)

FOREIGN PATENT DOCUMENTS

EP 2065346 A1 * 6/2009
JP 2002-029827 A 1/2002
(Continued)

OTHER PUBLICATIONS

Machine translation of JP 2006/261351 A. Retrieved from Industrial Property Digital Library of the JPO on Feb. 4, 2015.*
(Continued)

*Primary Examiner* — Aaron Austin
*Assistant Examiner* — Zheren J Yang
(74) *Attorney, Agent, or Firm* — Arent Fox LLP

(57) ABSTRACT

A composite laminate ceramic electronic component that includes co-fired low dielectric constant ceramic layers and high dielectric constant ceramic layers. The low dielectric constant ceramic layers and high dielectric constant ceramic layers are each composed of a glass ceramic containing: a first ceramic composed of at least one of $MgAl_2O_4$ and $Mg_2SiO_4$; a second ceramic composed of BaO, $RE_2O_3$ (RE is a rare earth element), and $TiO_2$; glass containing each of 44.0-69.0 wt % of RO (R is an alkaline-earth metal), 14.2-30.0 wt % of $SiO_2$, 10.0-20.0 wt % of $B_2O_3$, 0.5-4.0 wt % of $Al_2O_3$, 0.3-7.5 wt % of $Li_2O$, and 0.1-5.5 wt % of MgO; and MnO. The content ratios of the first ceramic, second ceramic, glass, and MnO are varied between the low dielectric constant ceramic layers and the high dielectric constant ceramic layers, wherein the content of MnO in the low dielectric constant ceramic layers is 7.5-18.5 wt % MnO.

20 Claims, 5 Drawing Sheets

(51) Int. Cl.
- *H01G 4/12* (2006.01)
- *B32B 18/00* (2006.01)
- *C04B 35/20* (2006.01)
- *C04B 35/443* (2006.01)

(52) U.S. Cl.
CPC .............. *H01G 4/129* (2013.01); *B32B 18/00* (2013.01); *C04B 35/20* (2013.01); *C04B 35/443* (2013.01); *C04B 2235/3206* (2013.01); *C04B 2235/3215* (2013.01); *C04B 2235/3217* (2013.01); *C04B 2235/3222* (2013.01); *C04B 2235/3224* (2013.01); *C04B 2235/3232* (2013.01); *C04B 2235/3262* (2013.01); *C04B 2235/3281* (2013.01); *C04B 2235/3418* (2013.01); *C04B 2235/3445* (2013.01); *C04B 2235/3481* (2013.01); *C04B 2235/36* (2013.01); *C04B 2235/6025* (2013.01); *C04B 2235/80* (2013.01); *C04B 2237/341* (2013.01); *C04B 2237/343* (2013.01); *C04B 2237/62* (2013.01); *C04B 2235/365* (2013.01); *C04B 2237/66* (2013.01)

(56) References Cited

U.S. PATENT DOCUMENTS

| | | | |
|---|---|---|---|
| 8,183,171 B2 | 5/2012 | Arashi et al. | |
| 2006/0287184 A1* | 12/2006 | Mori et al. | 501/32 |
| 2007/0213202 A1* | 9/2007 | Arashi et al. | 501/138 |
| 2010/0237007 A1* | 9/2010 | Merkel et al. | 210/510.1 |
| 2011/0110018 A1* | 5/2011 | Ishii et al. | 361/321.5 |
| 2011/0223431 A1* | 9/2011 | Sakurai et al. | 428/446 |
| 2011/0242728 A1* | 10/2011 | Sakurai et al. | 361/321.1 |
| 2012/0015198 A1* | 1/2012 | Masukawa et al. | 428/446 |

FOREIGN PATENT DOCUMENTS

| | | |
|---|---|---|
| JP | 2002-104870 A | 4/2002 |
| JP | 2003-063861 A | 3/2003 |
| JP | 2006-124270 A | 5/2006 |
| JP | 2006261351 A * | 9/2006 |
| JP | 2010-235327 A | 10/2010 |
| WO | WO 2010110201 A1 * | 9/2010 |

OTHER PUBLICATIONS

PCT/JP2012/053260 Written Opinion dated Apr. 23, 2012.

* cited by examiner

COMPOSITE LAMINATE CERAMIC ELECTRONIC COMPONENT

CROSS REFERENCE TO RELATED APPLICATIONS

The present application is a continuation of International application No. PCT/JP2012/053260, filed Feb. 13, 2012, which claims priority to Japanese Patent Application No. 2011-112127, filed May 19, 2011, the entire contents of each of which are incorporated herein by reference.

FIELD OF THE INVENTION

This invention relates to a laminate ceramic electronic component such as a multilayer ceramic substrate configured to have therein, for example, a microwave resonator, a filter, or a capacitor, etc, and in particular, to a composite laminate ceramic electronic component that has a composite structure of stacked low dielectric constant ceramic layer with a relatively low relative permittivity and high dielectric constant ceramic layer with a relatively high relative permittivity.

BACKGROUND OF THE INVENTION

In recent years, with the reduction in size, weight, and thickness for electronic devices, the reduction in size has been required for electronic components for use in electronic devices. However, conventionally, electronic components such as capacitors and resonators are each configured separately, and the reduction just in size for these components thus has limitations in the reduction in size for electronic devices. Consequently, various multilayer ceramic substrates have been proposed which have elements such as capacitors and resonators configured therein.

In addition, in order to deal with further reductions in size and recent higher frequencies for multilayer ceramic substrates, various multilayer ceramic substrates has been also proposed which have a composite structure of low dielectric constant ceramic layers and high dielectric constant ceramic layers stacked. For example, as described in JP 2002-29827 A (Patent Document 1) and JP 2003-63861 A (Patent Document 2), multilayer ceramic substrates have been proposed in which high dielectric constant ceramic layers composed of a high dielectric constant and low-dielectric-loss material, with elements such as capacitors and resonators configured therein, are placed to be sandwiched by low dielectric constant ceramic layers with wiring formed and semiconductor elements mounted.

Patent Document 1 and Patent Document 2 also disclose a glass ceramic composition suitable for forming low dielectric constant ceramic layers or a glass ceramic composition suitable for forming high dielectric constant ceramic layers.

More specifically, Patent Document 1 discloses, in claim 1 thereof, a glass ceramic composition containing a $MgAl_2O_4$-based ceramic and glass. More particularly, a glass ceramic composition is disclosed which contains: a $MgAl_2O_4$-based ceramic powder; and a glass powder containing 13 to 50% by weight of silicon oxide in terms of $SiO_2$, 8 to 60% by weight of boron oxide in terms of $B_2O_3$, 0 to 20% by weight of aluminum oxide in terms of $Al_2O_3$, and 10 to 55% by weight of magnesium oxide in terms of MgO.

In addition, Patent Document 1 discloses, in claim 2 thereof, an alkaline-earth metal oxide which may be further contained in a proportion of 20% by weight or less, and in claim 6 thereof, the glass content which may be preferably 20 to 80% by weight of the total.

The glass ceramic composition disclosed in Patent Document 1 achieves, in the case of a sintered body thereof, a relatively low relative permittivity such as, for example, 8 or less, and can be thus made suitable for high-frequency applications.

Next, Patent Document 2 discloses, as a high dielectric constant material constituting high dielectric constant ceramic layers with a relatively high relative permittivity, a material containing a $BaO$—$TiO_2$—$RE_2O_3$ (RE is a rare-earth element) based dielectric and glass. The glass contains, according to claim 2 of Patent Document 2, 10 to 25% by weight of $SiO_2$, 10 to 40% by weight of $B_2O_3$, 25 to 55% by weight of MgO, 0 to 20% by weight of ZnO, 0 to 15% by weight of $Al_2O_3$, 0.5 to 10% by weight of $Li_2O$, and 0 to 10% by weight of RO (R is at least one of Ba, Sr, and Ca). In addition, as disclosed in claim 4 of Patent Document 2, the content of the glass is preferably 15 to 35% by weight.

On the other hand, Patent Document 2 discloses a material similar to that in Patent Document 1, as a low dielectric constant material constituting the low dielectric constant ceramic layers.

The inventors have first found insulation reliability to be further improved, as a result of making further experiments on the respective glass ceramic compositions described in Patent Documents 1 and 2 mentioned above. The cause is assumed as follows.

The glass contained in the glass ceramic composition disclosed in each of Patent Documents 1 and 2 is indented to allow firing at a temperature of 1000° C. or lower, but is a composition that is likely to be crystallized. In the case of the glass ceramic compositions described in Patent Documents 1 and 2, the glass component and the ceramic component react to deposit crystals in the firing process, and it is thus difficult to stabilize the crystal quantity and the quantity of the glass component at the time of firing completed. Further, this instability of the crystal quantity and the quantity of the glass component at the time of firing completed is assumed to decrease the insulation reliability.

For example, the glass contained in the glass ceramic compositions described in each of Patent Documents 1 and 2 contains a relatively large amount of MgO, this large amount of MgO in the glass is believed to deposit crystals of $MgAl_2O_4$ and/or $Mg_2SiO_4$ from the glass component, and this deposition is assumed to lead to a decrease in insulation reliability.

In addition, in particular, the high dielectric constant material described in Patent Document 2 requires the addition of glass in order to allow firing at temperatures of 1000° C. or less, and on the other hand, requires a $BaO$—$TiO_2$—$RE_2O_3$ based dielectric contained in order to increase the relative permittivity. However, free Ti ions from the $BaO$—$TiO_2$—$RE_2O_3$ based dielectric cause oxygen defects. Furthermore, these oxygen defects can cause a decrease in insulation reliability in use at high temperature, high voltage, or for a long period of time, etc.

In addition, the inventors of the present application have recognized, as a result of repeated experiments, problems of the compositions of the respective glass ceramic compositions described in Patent Documents 1 and 2, such as difficulty in stably achieving desired relative permittivity in a wide range from low relative permittivity to high relative permittivity.

More specifically, the glass contained in the glass ceramic compositions described in Patent Documents 1 and 2 is likely to react with the ceramic component to be crystallized in the firing process as described previously. Once the crystals are deposited, the relative permittivity will be changed, and it will be thus difficult to achieve desired relative permittivity.

In addition, the glass contained in the glass ceramic compositions described in Patent Documents 1 and 2 fails to have favorable wettability to $MgAl_2O_4$ based ceramics or $BaO$—$TiO_2$—$RE_2O_3$ based dielectrics. Therefore, the glass ceramic composition is not able to be sintered, unless a relatively large amount of glass is added. However, the large addition amount of glass will decrease the relative permittivity. Thus, it is difficult to prepare, in particular, high dielectric constant materials.

Furthermore, as a specific problem with composite laminate ceramic electronic components, it has to be also considered whether the properties obtained in the case of a low dielectric constant ceramic layer by itself and the properties obtained in the case of a high dielectric constant ceramic layer by itself are almost maintained in the case of co-fired low dielectric constant ceramic layers and high dielectric constant ceramic layers. In particular, the glass contained in the glass ceramic composition described in each of Patent Documents 1 and 2 has a composition that is likely to be crystallized, and thus, from the perspective of difficulty in stabilizing the crystal quantity and the quantity of the glass component at the time of firing completed, it is assumed that there can be also a good possibility that, as a result of co-firing the low dielectric constant ceramic layer and the high dielectric constant ceramic layer, the properties of the respective ceramic layers by themselves will be lost.

Patent Document 1: JP 2002-29827 A
Patent Document 2: JP 2003-63861 A

SUMMARY OF THE INVENTION

Therefore, an object of this invention is to provide a composite laminate ceramic electronic component that can have co-fired low dielectric constant ceramic layers and high dielectric constant ceramic layers, and achieve reasonable properties for each of the low dielectric constant ceramic layers and high dielectric constant ceramic layers.

This invention is directed to a composite laminate ceramic electronic component including a low dielectric constant ceramic layer and a high dielectric constant ceramic layer which are stacked, and in order to solve the technical problems described above, the component characteristically has the following features.

The low dielectric constant ceramic layer and the high dielectric constant ceramic layer each include a glass ceramic containing: (1) a first ceramic including at least one of $MgAl_2O_4$ and $Mg_2SiO_4$; (2) a second ceramic including BaO, $RE_2O_3$ (RE is a rare-earth element), and $TiO_2$; (3) glass containing each of 44.0 to 69.0% by weight of RO (R is at least one alkaline-earth metal selected from Ba, Ca, and Sr), 14.2 to 30.0% by weight of $SiO_2$, 10.0 to 20.0% by weight of $B_2O_3$, 0.5 to 4.0% by weight of $Al_2O_3$, 0.3 to 7.5% by weight of $Li_2O$, and 0.1 to 5.5% by weight of MgO; and (4) MnO.

Further, the low dielectric constant ceramic layer contains 47.55 to 69.32% by weight of the first ceramic, contains 6 to 20% by weight of the glass, contains 7.5 to 18.5% by weight of MnO, and contains, as the second ceramic, each of 0.38 to 1.43% by weight of BaO, 1.33 to 9.5% by weight of $RE_2O_3$, and 0.95 to 6.75% by weight of $TiO_2$, and has a relative permittivity of 15 or less.

On the other hand, the high dielectric constant ceramic layer contains 1 to 15% by weight of the first ceramic, contains 3 to 15% by weight of the glass, contains 2.3 to 10% by weight of MnO, and contains, as the second ceramic, each of 2.5 to 15.7% by weight of BaO, 24.6 to 65.3% by weight of $RE_2O_3$, and 11.2 to 36.4% by weight of $TiO_2$, and has a relative permittivity of 30 or more.

Preferably, the content $G_L$ of the glass contained in the low dielectric constant ceramic layer and the content $G_H$ of the glass contained in the high dielectric constant ceramic layer are adapted to satisfy the condition of $1.0 \leq G_L/G_H \leq 2.0$. As can be seen from the experimental examples described later, when this condition is satisfied, the insulation reliability of, in particular, the low dielectric constant ceramic layer can be improved.

In addition, preferably, the content $M_L$ of the MnO contained in the low dielectric constant ceramic layer and the content $M_H$ of the MnO contained in the high dielectric constant ceramic layer are adapted to satisfy the condition of $1.5 \leq M_L/M_H \leq 3.6$. As can be seen from the experimental examples described later, when this condition is satisfied, the insulation reliability of, in particular, the high dielectric constant ceramic layer can be improved.

More preferably, the two conditions mentioned above are both satisfied. Thus, as can be seen from the experimental examples described later, the insulation reliability can be further improved for both the low dielectric constant ceramic layer and the high dielectric constant ceramic layer.

In addition, the low dielectric constant ceramic layer preferably further contains 3.0 to 20.0% by weight of at least one of $Mg_2Al_4Si_5O_{18}$ and $BaAl_2Si_2O_8$. Thus, as can be seen from the experimental examples described later, warpage can be made less likely to be caused in the composite laminate ceramic electronic component.

The low dielectric constant ceramic layer may further contain 0.23% by weight or less of CuO, and the high dielectric constant ceramic layer may further contain 1.2% by weight or less of CuO.

According to this invention, the low dielectric constant ceramic layer and the high dielectric constant ceramic layer are composed of the glass ceramics containing the common element, and thus, the low dielectric constant ceramic layer and the high dielectric constant ceramic layer can be subjected to co-sintering without any problem.

In addition, for each of the low dielectric constant ceramic layer and the high dielectric constant ceramic layer, the glass contained therein is less likely to be crystallized, also with the MnO contained therein, thus making it possible to increase the insulation reliability.

Furthermore, the low dielectric constant ceramic layer can achieve properties such as a relative permittivity of 15 or less, high insulation reliability, a high Qf value, and a temperature coefficient of capacitance (TCC) of 150 ppm/K or less in terms of absolute value.

On the other hand, the high dielectric constant ceramic layer can achieve properties such as a relative permittivity of 30 or more, high insulation reliability, a high Qf value, and a temperature coefficient of capacitance (TCC) of 150 ppm/K or less in terms of absolute value.

DETAILED DESCRIPTION OF THE INVENTION

Figure 1:
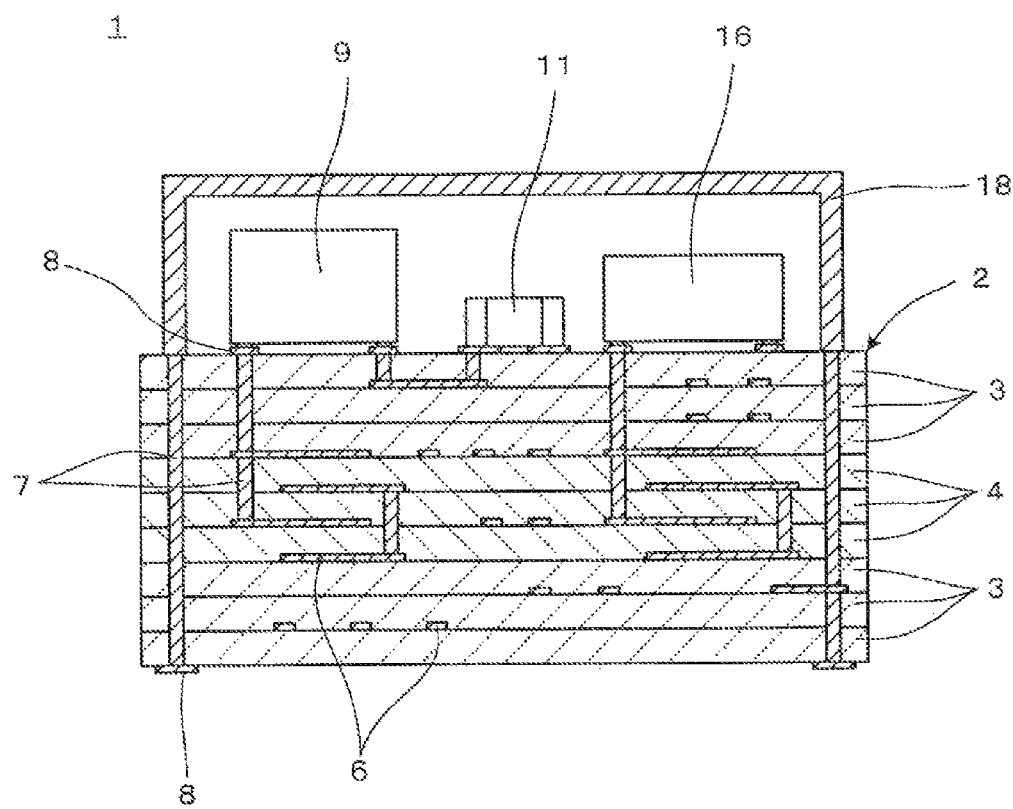
FIG. 1 is a cross-sectional view illustrating a ceramic multilayer module 1 including a multilayer ceramic substrate 2, an example of a composite laminate ceramic electronic component according to this invention.

A ceramic multilayer module 1 including a multilayer ceramic substrate 2, an example of a composite laminate ceramic electronic component according to this invention, will be described with reference to FIGS. 1 and 2.

The multilayer ceramic substrate 2 included in the ceramic multilayer module 1 includes a plurality of low dielectric constant ceramic layers 3 stacked and a plurality of high dielectric constant ceramic layers 4 stacked, the plurality of low dielectric constant ceramic layers 3 is located to sandwich the plurality of high dielectric constant ceramic layers 4, and these layers are co-fired.

The low dielectric constant ceramic layers 3 and the high dielectric constant ceramic layers 4 are each composed of a glass ceramic including:

(1) a first ceramic composed of at least one of $MgAl_2O_4$ and $Mg_2SiO_4$;

(2) a second ceramic composed of BaO, $RE_2O_3$ (RE is a rare-earth element), and $TiO_2$;

(3) glass containing each of 44.0 to 69.0% by weight of RO (R is at least one alkaline-earth metal selected from Ba, Ca, and Sr), 14.2 to 30.0% by weight of $SiO_2$, 10.0 to 20.0% by weight of $B_2O_3$, 0.5 to 4.0% by weight of $Al_2O_3$, 0.3 to 7.5% by weight of $Li_2O$, and 0.1 to 5.5% by weight of MgO; and (4) MnO.

As described above, the low dielectric constant ceramic layers 3 and the high dielectric constant ceramic layers 4 are composed of the glass ceramics containing the common element, and thus, the low dielectric constant ceramic layers 3 and the high dielectric constant ceramic layers 4 can be subjected to co-sintering without any problem.

In addition, the glass ceramics for use in this invention achieve the following effects as will be clear from the experimental examples described later.

(A) The insulation reliability is high.

The glass contained in the glass ceramics has a composition that is less likely to be crystallized. Therefore, the crystal quantity and the glass component quantity are stabilized at the time of firing completed, and the insulation reliability can be thus improved. This is because this glass has a smaller MgO content, as compared with the glass contained in the glass ceramics described in Patent Documents 1 and 2, and thus can suppress the deposition of crystals such as $MgAl_2O_4$ and $Mg_2SiO_4$, and moreover, has an increased RO content, and thus can provide a composition that is not crystallized.

In addition, the glass ceramic composition contains MnO. The compositions disclosed in Patent Documents 1 and 2 contain no MnO. Ti ions produced by the reduction of the Ti oxide can cause oxygen defects, thereby causing a decrease in insulation reliability in use at high temperature, high voltage, or for a long period of time, etc. In this invention, the substitution of Mn at the Ti site suppresses the generation of oxygen defects. This suppression is also assumed to contribute an improvement in insulation reliability.

(B) Products with a desired relative permittivity can be easily obtained over a wide range from low relative permittivity to high relative permittivity.

As describe previously, the glass disclosed in Patent Documents 1 and 2 is likely to be crystallized by reaction with the ceramic component, and thus likely to undergo a change in relative permittivity. In contrast, the glass contained in the glass ceramic for use in this invention is less likely to be crystallized, and it is thus easy to prepare products with a desired relative permittivity.

In addition, the glass contained in the glass ceramic for use in this invention is glass that has high wettability on, and low reactivity with the first ceramic and second ceramic described above. Therefore, the glass ceramic can be sintered even when the glass component is reduced, whereas the glass ceramic is less likely to develop a reaction and is stable even when the glass component is increased. Therefore, it is possible to widely adjust the respective contents of the ceramic component and glass component in the glass ceramic, and thus, a wide range of products from low-dielectric constant products to high-dielectric constant products can be easily provided just by adjusting the respective contents of the ceramic component and glass component. More specifically, glass ceramics suitable for constituting the low dielectric constant ceramic layers 3 and glass ceramics suitable for constituting the high dielectric constant ceramic layers 4 can be provided as will be described below.

It is to be noted that the glass ceramic for use in this invention will not vary significantly in composition between before and after firing. Although $B_2O_3$ or $Li_2O$ in the glass may volatilize during firing in some cases, the proportions of the other constituents after the firing are almost unchanged from those before the firing even in those cases.

The glass ceramic constituting the low dielectric constant ceramic layers 3 contains 47.55 to 69.32% by weight of the first ceramic, contains 6 to 20% by weight of the glass, contains 7.5 to 18.5% by weight of MnO, and contains, as the second ceramic, each of 0.38 to 1.43% by weight of BaO, 1.33 to 9.5% by weight of $RE_2O_3$, and 0.95 to 6.75% by weight of $TiO_2$.

The low dielectric constant ceramic layers 3 can achieve properties such as a relative permittivity of 15 or less, high insulation reliability, a high Qf value, and a temperature coefficient of capacitance (TCC) of 150 ppm/K or less in terms of absolute value.

On the other hand, the glass ceramic constituting the high dielectric constant ceramic layers 4 contains 1 to 15% by weight of the first ceramic, contains 3 to 15% by weight of the glass, contains 2.3 to 10% by weight of MnO, and contains, as the second ceramic, each of 2.5 to 15.7% by weight of BaO, 24.6 to 65.3% by weight of $RE_2O_3$, and 11.2 to 36.4% by weight of $TiO_2$.

The high dielectric constant ceramic layers 4 can achieve properties such as a relative permittivity of 30 or more, high insulation reliability, a high Qf value, and a temperature coefficient of capacitance (TCC) of 150 ppm/K or less in terms of absolute value.

Preferably, the content $G_L$ of the glass contained in the low dielectric constant ceramic layers 3 and the content $G_H$ of the glass contained in the high dielectric constant ceramic layers 4 are adapted to satisfy the condition of $1.0 \leq G_L/G_H \leq 2.0$. As can be seen from the experimental examples described later, when this condition is satisfied, the insulation reliability of, in particular, the low dielectric constant ceramic layers 3 can be improved. This is assumed to be because interdiffusion can be suppressed between the glass component in the low dielectric constant ceramic layers 3 and the glass component in the high low dielectric constant ceramic layers 4.

In addition, preferably, the content $M_L$ of the MnO contained in the low dielectric constant ceramic layers 3 and the content $M_H$ of the MnO contained in the high dielectric constant ceramic layers 4 are adapted to satisfy the condition of $1.5 \leq M_L/M_H \leq 3.6$. As can be seen from the experimental examples described later, when this condition is satisfied, the insulation reliability of, in particular, the high dielectric constant ceramic layers 4 can be improved. This is assumed to be because interdiffusion can be suppressed between the MnO component in the low dielectric constant ceramic layers 3 and the MnO component in the high low dielectric constant ceramic layers 4.

More preferably, the two conditions mentioned above are both satisfied. Thus, as can be seen from the experimental examples described later, the insulation reliability can be further improved for both the low dielectric constant ceramic layers 3 and the high dielectric constant ceramic layers 4.

In addition, the low dielectric constant ceramic layers 3 preferably further contains 3.0 to 20.0% by weight of at least one of $Mg_2Al_4Si_5O_{18}$ and $BaAl_2Si_2O_8$. Thus, as can be seen from the experimental examples described later, warpage can be made less likely to be caused in the multilayer ceramic substrate 2.

The low dielectric constant ceramic layers 3 may further contain 0.23% by weight or less of CuO, and the high dielectric constant ceramic layers 4 may further contain 1.2% by weight or less of CuO.

The multilayer ceramic substrate 2 includes various wiring conductors. The wiring conductors typically include internal conductor films 6 formed along the specific interfaces between the ceramic layers 3 and 4, via hole conductors 7 extending to penetrate specific one of the ceramic layers 3 and 4, and external conductor films 8 formed on the outer surface of the multilayer ceramic substrate 2.

Some of the internal conductor films 6 mentioned above, which are provided in conjunction with the high dielectric constant ceramic layers 4, are arranged so as to provide electrostatic capacitance, thereby constituting capacitor elements.

On the upper surface of the multilayer ceramic substrate 2, multiple electronic components 9 to 17 are mounted. Among the electronic components 9 to 17 shown in the figure, for example, the electronic component 9 is a diode, the electronic component 11 is a laminated ceramic capacitor, and the electronic component 16 is a semiconductor IC. These electronic components 9 to 17 constitute circuits required for the ceramic multilayer module 1 along with the wiring conductors formed inside the multilayer ceramic substrate 2, while being electrically connected to specific one of the external conductor films 8 formed on the upper surface of the multilayer ceramic substrate 2.

The upper surface of the multilayer ceramic substrate 2 has a conductive cap 18 fixed thereon for shielding the electronic components 9 to 17. The conductive cap 18 is electrically connected to specific one of the via hole conductors 7 mentioned previously.

Furthermore, the ceramic multilayer module 1 is mounted on a mother board, not shown, with the use of, as a terminal for connection, specific one of the external conductor films 8 formed on the lower surface of the multilayer ceramic substrate 2.

The multilayer ceramic substrate 2 can be manufactured with the use of known co-firing techniques for ceramic laminates.

Specifically, ceramic green sheets for the low dielectric constant ceramic layers 3 are first prepared. More specifically, an organic vehicle composed of a binder resin and a solvent is added to a raw material composition for providing the glass ceramic described above, thereby providing ceramic slurry. This ceramic slurry is formed into the shape of a sheet by, for example, a doctor blade method, dried, and then punched out into a predetermined size, thereby providing ceramic green sheets. Then, a conductive paste containing, for example, copper or silver as its main constituent is applied in a predetermined pattern to the ceramic green sheets in order to form wiring conductors.

On the other hand, ceramic green sheets containing a raw material composition for providing the glass ceramic constituting the high dielectric constant ceramic layers 4 are prepared by the same method as in the case of the ceramic green sheets for the low dielectric constant ceramic layers 3. Then, a conductive paste containing, for example, copper or silver as its main constituent is applied in a predetermined pattern to the ceramic green sheets in order to form wiring conductors.

Next, the ceramic green sheets for the low dielectric constant ceramic layers 3 and the ceramic green sheets for the high dielectric constant ceramic layers 4, which are obtained in the way described above, are stacked in a predetermined order for a predetermined number of layers, and a pressure is applied then in the thickness direction.

Next, the raw laminate obtained in the way described above is subjected to firing at a temperature of 1000° C. or lower, for example, 800 to 1000° C., thereby making it possible to obtain the multilayer ceramic substrate 2. In this case, the firing is, in the case of the wiring conductors containing copper as their main constituent, carried out in a non-oxidizing atmosphere such as a nitrogen atmosphere, or in the case of the wiring conductors containing silver as their main constituent, in an oxidizing atmosphere such as the atmosphere.

Next, soldering or the like is applied to the surface of the multilayer ceramic substrate 2 to mount the electronic components 9 to 17 and attach the conductive cap 18, thereby completing the ceramic multilayer module 1.

The ceramic multilayer module 1 described above can be made suitable for high-frequency applications, and excellent in reliability, because the low dielectric constant ceramic layers 3 included in the multilayer ceramic substrate 2 have a relative permittivity of 15 or less, a high Qf value, and a temperature coefficient of capacitance (TCC) of 150 ppm/K or less in terms of absolute value, whereas the high dielectric constant ceramic layers 4 therein have a relative permittivity of 30 or more, a high Qf value, and a temperature coefficient of capacitance (TCC) of 150 ppm/K or less in terms of absolute value. Furthermore, the ceramic multilayer module 1 can be made excellent in insulation reliability.

Next, an LC filter 21 as another example of the composite laminate ceramic electronic component according to this invention will be described with reference to FIGS. 3 through 5.

Figure 3:
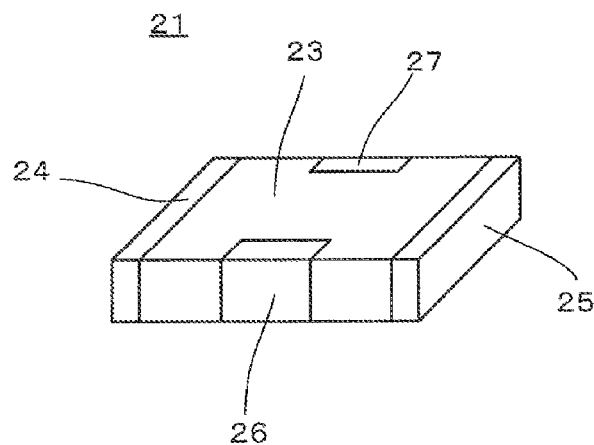
FIG. 3 is a perspective view illustrating the appearance of an LC filter 21 as another example of the composite laminate ceramic electronic component according to this invention.

The LC filter 21 includes, as shown in FIG. 3, a component main body 23 as a laminate structure, which is composed of a plurality of glass ceramic layers stacked, terminal electrodes 24 and 25 are provided on each end of the outer surface of the component main body 23, and terminal electrodes 26 and 27 are provided in middle portions on each side surface.

Figure 4:
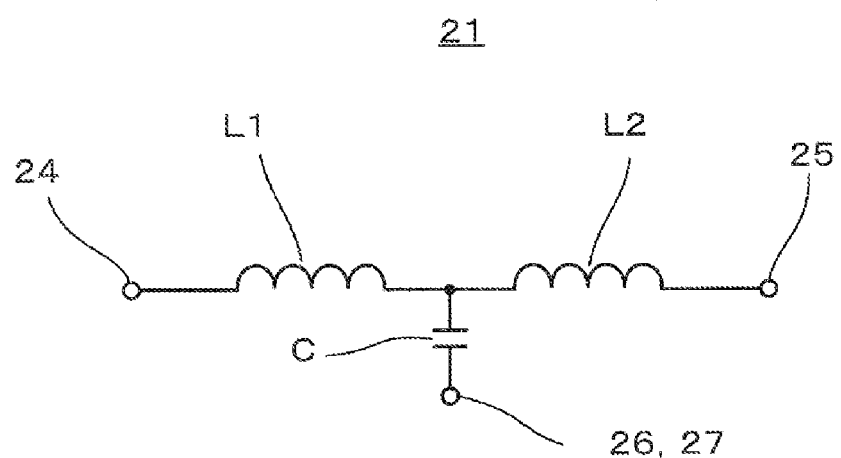
FIG. 4 is an equivalent circuit diagram given by the LC filter 21 shown in FIG. 3.

The LC filter 21 is intended to constitute, as shown in FIG. 4, two inductances L1 and L2 connected in series between the terminal electrodes 24 and 25, and constitute capacitance C between the connecting point of the inductances L1 and L2 and the terminal electrodes 26 and 27.

Figure 5:
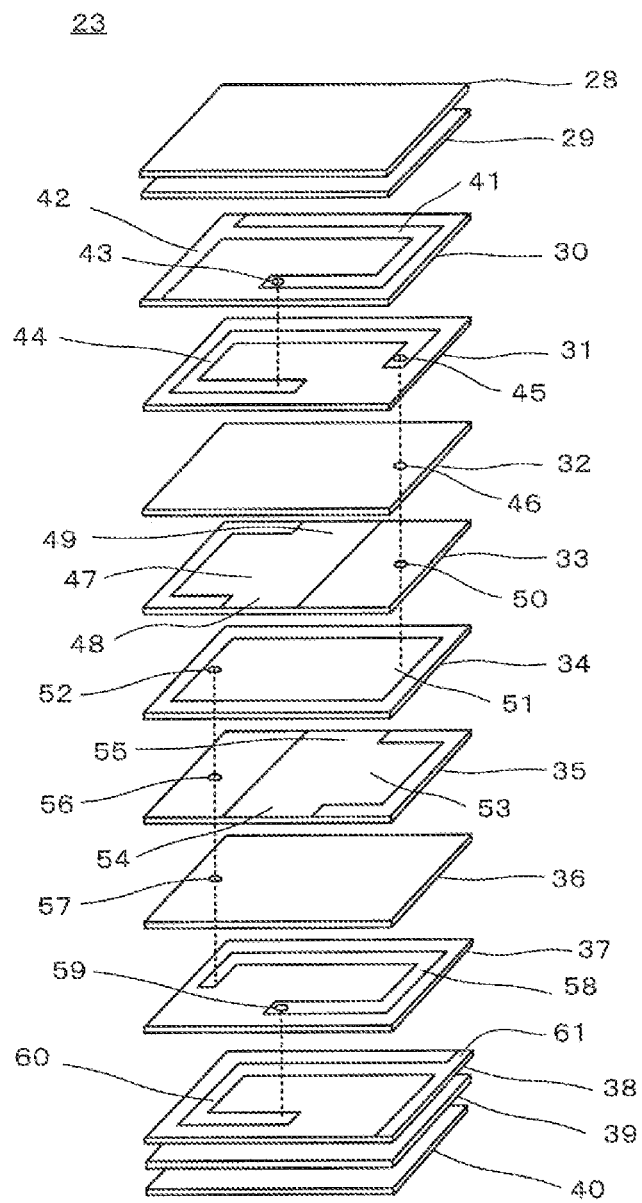
FIG. 5 is a perspective view illustrating, in an exploded form, a component main body 23 included in the LC filter 21 shown in FIG. 3.

As shown in FIG. 5, the component main body 23 includes a plurality of ceramic layers 28 to 40 stacked. It is to be noted that the number of ceramic layers stacked is not limited to the number shown in the figure.

The ceramic layers 28 to 40 are each obtained in such a way that an organic vehicle composed of a binder resin and a solvent is added to a raw material composition for providing the glass ceramic, the ceramic slurry obtained by mixing these materials is formed into the shape of a sheet by a doctor blade method, dried, and then punched out into a predetermined size to obtain ceramic green sheets, the ceramic green sheets are subjected to firing.

In addition, in order to provide the inductances L1 and L2 as well as the capacitance C as shown in FIG. 4, wiring conductors are provided in the following manner, in conjunction with specific one of the ceramic layers 28 to 40.

On the ceramic layer 30, a coil pattern 41 is formed which constitutes a portion of the inductance L1, and an extraction pattern 42 is formed which extends from one end of the coil pattern 41, and the other end of the coil pattern 41 is provided with a via hole conductor 43. The extraction pattern 42 is connected to the terminal electrode 24.

On the ceramic layer 31, a coil pattern 44 is formed which constitutes a portion of the inductance L1, and one end of the pattern is provided with a via hole conductor 45. The other end of the coil pattern 44 is connected to the via hole conductor 43 described previously.

The ceramic layer 32 is provided with a via hole conductor 46 connected to the via hole conductor 45 described above.

On the ceramic layer 33, a capacitor pattern 47 is formed which constitutes a portion of the capacitance C, and extraction patterns 48 and 49 are formed which extend from the capacitor pattern 47. The extraction patterns 48 and 49 are connected to the terminal electrodes 26 and 27. In addition, the ceramic layer 33 is provided with a via hole conductor 50 connected to the via hole conductor 46 described previously.

On the ceramic layers 34, a capacitor pattern 51 is formed which constitutes a portion of the capacitance C, and a via hole conductor 52 is provided which is connected to the capacitor pattern 51. The capacitor pattern 51 is connected to the via hole conductor 50 mentioned previously.

On the ceramic layer 35, a capacitor pattern 53 is formed which constitutes a portion of the capacitance C, and extraction patterns 54 and 55 are formed which extend from the capacitor pattern 53. The extraction patterns 54 and 55 are connected to the terminal electrodes 26 and 27. In addition, the ceramic layer 35 is provided with a via hole conductor 56 connected to the via hole conductor 52 described previously.

The ceramic layer 36 is provided with a via hole conductor 57 connected to the via hole conductor 56 described above.

On the ceramic layer 37, a coil pattern 58 is formed which constitutes a portion of the inductance L2, and one end of the pattern is provided with a via hole conductor 59. The other end of the coil pattern 58 is connected to the via hole conductor 57 described previously.

On the ceramic layer 38, a coil pattern 60 is formed which constitutes a portion of the inductance L2, and an extraction pattern 61 is formed which extends from one end of the coil pattern 60. The extraction pattern 61 is connected to the terminal electrode 25. The other end of the coil pattern 60 is connected to the via hole conductor 59 described previously.

For the formation of the above coil patterns 41, 44, 58, and 60, extraction patterns 42, 48, 49, 54, 55, and 61, via hole conductors 43, 45, 46, 50, 52, 56, 57, and 59, as well as capacitor patterns 47, 51, and 53 as wiring conductors, a conductive paste containing, for example, copper or silver as its main constituent is used, and for example, screen printing is applied for the application of the conductive paste.

Then, in order to obtain the component main body 23, the ceramic green sheets to serve as each of the ceramic layers 28 to 40 described above are stacked in a predetermined order, to which a pressure is applied in the thickness direction, and then subjected to firing at a temperature of 1000° C. or lower, for example, 800 to 1000° C. In this case, as in the case of the ceramic multilayer module 1 described previously, the firing is, in the case of the wiring conductors containing copper as their main constituent, carried out in a non-oxidizing atmosphere such as a nitrogen atmosphere, or in the case of the wiring conductors containing silver as their main constituent, in an oxidizing atmosphere such as the atmosphere.

Furthermore, for the formation of the terminal electrodes 24 to 27 on the outer surface of the component main body 23, applying and baking a conductive paste containing copper or silver as its main constituent, or a thin-film formation method, such as vapor deposition, plating, or sputtering is used, for example.

Figure 2:
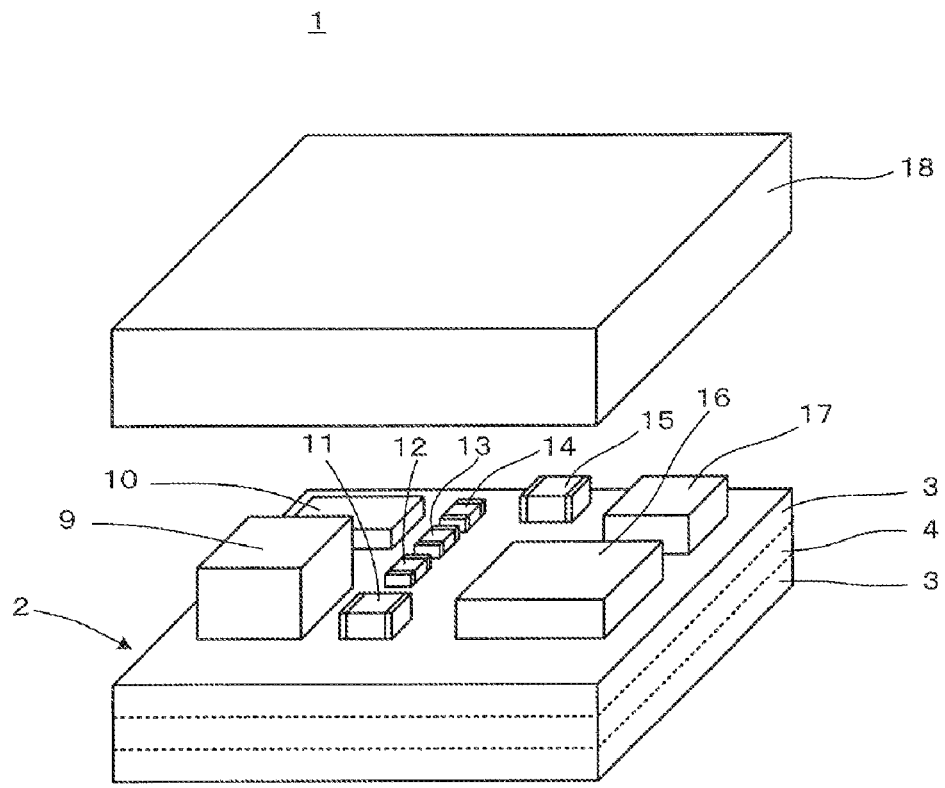
FIG. 2 is a perspective view illustrating the ceramic multilayer module 1 shown in FIG. 1 in an exploded form.

In the LC filter 21 described above, among the ceramic layers 28 to 40, in particular, the ceramic layers 33 and 34 which directly contribute to the configuration of the capacitance C are composed of the same high dielectric constant ceramic material as the material which constitutes the high dielectric constant ceramic layers 4 included in the ceramic multilayer module 1 shown in FIG. 1 described previously, whereas the other ceramic layers 28 to 32 and 35 to 40 are composed of the same low dielectric constant ceramic material as the material which constitutes the low dielectric constant ceramic layers 3 included in the ceramic multilayer module 1.

This invention can be also applied to composite laminate ceramic electronic components other than the ceramic multilayer module 1 or the LC filter 21 as shown in the figure.

Next, experimental examples will be described which were carried out for evaluating properties obtained from the glass ceramic for use in this invention and evaluating properties of composite laminate ceramic electronic components configured with the use of the glass ceramic.

[Preparation of Glass]

First, as glass contained in the glass ceramic and used commonly in the following experimental examples, compositions blended as shown in Table 1 were melted at a temperature of 1100 to 1400° C., rapidly cooled for vitrification, and then subjected to wet grinding to prepare glass powders of various compositions.

TABLE 1

| Symbol for Glass | $Li_2O$ (% by weight) | BaO (% by weight) | SrO (% by weight) | CaO (% by weight) | MgO (% by weight) | $SiO_2$ (% by weight) | $B_2O_3$ (% by weight) | $Al_2O_3$ (% by weight) | Total of Alkaline-Earth Metal (% by weight) |
|---|---|---|---|---|---|---|---|---|---|
| G1 | 0.2 | 45 | 6.5 | 2.5 | 0.5 | 28.2 | 15.1 | 2 | 54 |
| G2 | 0.3 | 45 | 6.5 | 2.5 | 0.5 | 27.7 | 15.5 | 2 | 54 |
| G3 | 2 | 45 | 6.5 | 2.5 | 0.5 | 26.5 | 15 | 2 | 54 |
| G4 | 7.5 | 43.5 | 6 | 2 | 0.5 | 24 | 14.5 | 2 | 51.5 |
| G5 | 8 | 43 | 6 | 2 | 0.5 | 23.5 | 15 | 2 | 51 |
| G6 | 2.6 | 28 | 12.9 | 4 | 0.5 | 30 | 20 | 2 | 44.9 |

TABLE 1-continued

| Symbol for Glass | Li$_2$O (% by weight) | BaO (% by weight) | SrO (% by weight) | CaO (% by weight) | MgO (% by weight) | SiO$_2$ (% by weight) | B$_2$O$_3$ (% by weight) | Al$_2$O$_3$ (% by weight) | Total of Alkaline-Earth Metal (% by weight) |
|---|---|---|---|---|---|---|---|---|---|
| G7  | 2.6 | 46.5 | 8    | 0.4 | 0.5 | 25.2 | 14.8 | 2   | 54.9 |
| G8  | 3.2 | 31.4 | 3.8  | 2.3 | 5.5 | 29.8 | 20   | 4   | 37.5 |
| G9  | 2.6 | 30   | 15   | 3.3 | 5.5 | 24.6 | 17   | 2   | 48.3 |
| G10 | 2.6 | 49   | 7.9  | 2.5 | 0.5 | 20.5 | 15   | 2   | 59.4 |
| G11 | 2.6 | 57   | 6.2  | 2.5 | 0.5 | 18.8 | 10.4 | 2   | 65.7 |
| G12 | 2.6 | 60   | 6.4  | 2.5 | 0.8 | 15   | 10.7 | 2   | 68.9 |
| G13 | 2.6 | 48.9 | 15.8 | 4.8 | 0.5 | 14.6 | 10.8 | 2   | 69.5 |
| G14 | 2.6 | 46.8 | 18.5 | 3.7 | 0.5 | 14.8 | 11.1 | 2   | 69 |
| G15 | 2.6 | 46.7 | 8.5  | 4.5 | 0.5 | 26.2 | 9    | 2   | 59.7 |
| G16 | 2.6 | 45   | 9    | 2.5 | 0.1 | 25.5 | 13.3 | 2   | 56.5 |
| G17 | 2.6 | 42   | 5.4  | 2.5 | 0.5 | 32   | 13   | 2   | 49.9 |
| G18 | 2.6 | 44.5 | 1.6  | 4.4 | 0.8 | 24.3 | 19.8 | 2   | 50.5 |
| G19 | 2.6 | 41.4 | 6.5  | 2   | 0.5 | 23.5 | 21.5 | 2   | 49.9 |
| G20 | 2.6 | 44   | 3.5  | 2.5 | 0.1 | 24.7 | 18.6 | 4   | 50 |
| G21 | 2.6 | 43.7 | 5    | 3.5 | 4   | 23.3 | 17.4 | 0.5 | 52.2 |
| G22 | 2.6 | 47   | 6.5  | 2.5 | 0.5 | 23.4 | 15   | 2.5 | 56 |
| G23 | 2.6 | 35.8 | 7.7  | 0.5 | 4   | 27.6 | 18.8 | 3   | 44 |
| G24 | 2.6 | 44.7 | 6    | 5   | 2.5 | 22   | 15   | 2.2 | 55.7 |
| G25 | 2.6 | 46.9 | 1    | 2.8 | 0.8 | 27.6 | 16.3 | 2   | 50.7 |
| G26 | 2.6 | 40.2 | 20   | 2.5 | 0.5 | 19.8 | 12.4 | 2   | 62.7 |
| G27 | 2.6 | 44.9 | 6    | 2   | 0.5 | 30   | 12   | 2   | 52.9 |
| G28 | 2.6 | 45.5 | 11.8 | 3.8 | 0.5 | 14.2 | 18.8 | 2.8 | 61.1 |
| G29 | 2.6 | 45.4 | 7.5  | 3.5 | 0.5 | 28.5 | 10   | 2   | 56.4 |
| G30 | 2.6 | 45.2 | 7.1  | 3.1 | 0.5 | 19.5 | 20   | 2   | 55.4 |
| G31 | 2.6 | 46.5 | 6.7  | 5.5 | 0.5 | 22.8 | 13.4 | 2   | 58.7 |
| G32 | 2.6 | 45   | 6.7  | 2.7 | 0   | 25.5 | 15.5 | 2   | 54.4 |
| G33 | 2.6 | 43.6 | 6.3  | 2.2 | 6.5 | 22.2 | 14.6 | 2   | 52.1 |
| G34 | 2.6 | 43.8 | 11.2 | 4.7 | 4.8 | 11.4 | 19.5 | 2   | 59.7 |
| G35 | 2.6 | 46.4 | 7.8  | 3.9 | 0.5 | 24.5 | 14   | 0.3 | 58.1 |
| G36 | 2.6 | 45   | 6.5  | 2.5 | 0.5 | 24.4 | 13.5 | 5   | 54 |

Experimental Example 1

In Experimental Example 1, evaluations were made on single bodies of glass ceramics for low dielectric constant ceramic layers.

First, as the first ceramic, MgCO$_3$ and Al$_2$O$_3$ were blended in predetermined proportions, and subjected to calcination and wet grinding to prepare a spinel compound: MgAl$_2$O$_4$, and MgCO$_3$ and SiO$_2$ were blended in predetermined proportions, and subjected to calcination and wet grinding to prepare a forsterite compound: Mg$_2$SiO$_4$.

Next, for the compositions shown in Tables 2 and 3, respective powders of the glass shown in Table 1, MgAl$_2$O$_4$, Mg$_2$SiO$_4$, BaO, TiO$_2$, Nd$_2$O$_3$ and Sm$_2$O$_3$ as RE$_2$O$_3$, MnO, and CuO were blended and mixed, and an organic solvent and a binder were then added to the mixture to prepare slurry.

TABLE 2

| Sample Number | Glass Symbol | Glass (% by weight) | First Ceramic (% by weight) | | Second Ceramic (% by weight) | | | | MnO (% by weight) | CuO (% by weight) |
|---|---|---|---|---|---|---|---|---|---|---|
| | | | MgAl$_2$O$_4$ | Mg$_2$SiO$_4$ | BaO | TiO$_2$ | Nd$_2$O$_3$ (RE$_2$O$_3$) | Sm$_2$O$_3$ (RE$_2$O$_3$) | | |
| 1  | G1  | 13 | 0     | 61.92 | 0.8 | 3.8 | 5.4 | 0 | 15 | 0.08 |
| 2  | G1  | 13 | 61.92 | 0     | 0.8 | 3.8 | 5.4 | 0 | 15 | 0.08 |
| 3  | G2  | 13 | 0     | 61.92 | 0.8 | 3.8 | 5.4 | 0 | 15 | 0.08 |
| 4  | G3  | 13 | 0     | 61.92 | 0.8 | 3.8 | 5.4 | 0 | 15 | 0.08 |
| 5  | G4  | 13 | 0     | 61.92 | 0.8 | 3.8 | 5.4 | 0 | 15 | 0.08 |
| 6  | G5  | 13 | 0     | 61.92 | 0.8 | 3.8 | 5.4 | 0 | 15 | 0.08 |
| 7  | G5  | 13 | 61.92 | 0     | 0.8 | 3.8 | 5.4 | 0 | 15 | 0.08 |
| 8  | G6  | 13 | 0     | 61.92 | 0.8 | 3.8 | 5.4 | 0 | 15 | 0.08 |
| 9  | G6  | 13 | 61.92 | 0     | 0.8 | 3.8 | 5.4 | 0 | 15 | 0.08 |
| 10 | G7  | 13 | 0     | 61.92 | 0.8 | 3.8 | 5.4 | 0 | 15 | 0.08 |
| 11 | G8  | 13 | 0     | 61.92 | 0.8 | 3.8 | 5.4 | 0 | 15 | 0.08 |
| 12 | G8  | 13 | 61.92 | 0     | 0.8 | 3.8 | 5.4 | 0 | 15 | 0.08 |
| 13 | G9  | 13 | 0     | 61.92 | 0.8 | 3.8 | 5.4 | 0 | 15 | 0.08 |
| 14 | G9  | 13 | 61.92 | 0     | 0.8 | 3.8 | 5.4 | 0 | 15 | 0.08 |
| 15 | G10 | 13 | 0     | 61.92 | 0.8 | 3.8 | 5.4 | 0 | 15 | 0.08 |
| 16 | G11 | 13 | 0     | 61.92 | 0.8 | 3.8 | 5.4 | 0 | 15 | 0.08 |
| 17 | G12 | 13 | 0     | 61.92 | 0.8 | 3.8 | 5.4 | 0 | 15 | 0.08 |
| 18 | G13 | 13 | 0     | 61.92 | 0.8 | 3.8 | 5.4 | 0 | 15 | 0.08 |
| 19 | G14 | 13 | 0     | 61.92 | 0.8 | 3.8 | 5.4 | 0 | 15 | 0.08 |
| 20 | G15 | 13 | 0     | 61.92 | 0.8 | 3.8 | 5.4 | 0 | 15 | 0.08 |
| 21 | G16 | 13 | 0     | 61.92 | 0.8 | 3.8 | 5.4 | 0 | 15 | 0.08 |

TABLE 2-continued

| Sample Number | Glass Symbol | Glass (% by weight) | First Ceramic (% by weight) MgAl$_2$O$_4$ | First Ceramic (% by weight) Mg$_2$SiO$_4$ | Second Ceramic (% by weight) BaO | Second Ceramic (% by weight) TiO$_2$ | Second Ceramic (% by weight) RE$_2$O$_3$ Nd$_2$O$_3$ | Second Ceramic (% by weight) RE$_2$O$_3$ Sm$_2$O$_3$ | MnO (% by weight) | CuO (% by weight) |
|---|---|---|---|---|---|---|---|---|---|---|
| 22 | G17 | 13 | 0 | 61.92 | 0.8 | 3.8 | 5.4 | 0 | 15 | 0.08 |
| 23 | G18 | 13 | 0 | 61.92 | 0.8 | 3.8 | 5.4 | 0 | 15 | 0.08 |
| 24 | G19 | 13 | 0 | 61.92 | 0.8 | 3.8 | 5.4 | 0 | 15 | 0.08 |
| 25 | G20 | 13 | 0 | 61.92 | 0.8 | 3.8 | 5.4 | 0 | 15 | 0.08 |
| 26 | G21 | 13 | 0 | 61.92 | 0.8 | 3.8 | 5.4 | 0 | 15 | 0.08 |
| 27 | G22 | 13 | 0 | 61.92 | 0.8 | 3.8 | 5.4 | 0 | 15 | 0.08 |
| 28 | G22 | 13 | 61.92 | 0 | 0.8 | 3.8 | 5.4 | 0 | 15 | 0.08 |
| 29 | G23 | 13 | 0 | 61.92 | 0.8 | 3.8 | 5.4 | 0 | 15 | 0.08 |
| 30 | G23 | 13 | 61.92 | 0 | 0.8 | 3.8 | 5.4 | 0 | 15 | 0.08 |
| 31 | G24 | 13 | 0 | 61.92 | 0.8 | 3.8 | 5.4 | 0 | 15 | 0.08 |
| 32 | G25 | 13 | 0 | 61.92 | 0.8 | 3.8 | 5.4 | 0 | 15 | 0.08 |
| 33 | G26 | 13 | 0 | 61.92 | 0.8 | 3.8 | 5.4 | 0 | 15 | 0.08 |
| 34 | G27 | 13 | 0 | 61.92 | 0.8 | 3.8 | 5.4 | 0 | 15 | 0.08 |
| 35 | G28 | 13 | 0 | 61.92 | 0.8 | 3.8 | 5.4 | 0 | 15 | 0.08 |
| 36 | G29 | 13 | 0 | 61.92 | 0.8 | 3.8 | 5.4 | 0 | 15 | 0.08 |
| 37 | G30 | 13 | 0 | 61.92 | 0.8 | 3.8 | 5.4 | 0 | 15 | 0.08 |
| 38 | G31 | 13 | 0 | 61.92 | 0.8 | 3.8 | 5.4 | 0 | 15 | 0.08 |
| 39 | G32 | 13 | 0 | 61.92 | 0.8 | 3.8 | 5.4 | 0 | 15 | 0.08 |
| 40 | G32 | 13 | 61.92 | 0 | 0.8 | 3.8 | 5.4 | 0 | 15 | 0.08 |
| 41 | G33 | 13 | 0 | 61.92 | 0.8 | 3.8 | 5.4 | 0 | 15 | 0.08 |
| 42 | G33 | 13 | 61.92 | 0 | 0.8 | 3.8 | 5.4 | 0 | 15 | 0.08 |
| 43 | G34 | 13 | 0 | 61.92 | 0.8 | 3.8 | 5.4 | 0 | 15 | 0.08 |
| 44 | G34 | 13 | 61.92 | 0 | 0.8 | 3.8 | 5.4 | 0 | 15 | 0.08 |
| 45 | G35 | 13 | 0 | 61.92 | 0.8 | 3.8 | 5.4 | 0 | 15 | 0.08 |
| 46 | G35 | 13 | 61.92 | 0 | 0.8 | 3.8 | 5.4 | 0 | 15 | 0.08 |
| 47 | G36 | 13 | 0 | 61.92 | 0.8 | 3.8 | 5.4 | 0 | 15 | 0.08 |
| 48 | G36 | 13 | 61.92 | 0 | 0.8 | 3.8 | 5.4 | 0 | 15 | 0.08 |

TABLE 3

| Sample Number | Glass Symbol | Glass (% by weight) | First Ceramic (% by weight) MgAl$_2$O$_4$ | First Ceramic (% by weight) Mg$_2$SiO$_4$ | Second Ceramic (% by weight) BaO | Second Ceramic (% by weight) TiO$_2$ | Second Ceramic (% by weight) RE$_2$O$_3$ Nd$_2$O$_3$ | Second Ceramic (% by weight) RE$_2$O$_3$ Sm$_2$O$_3$ | MnO (% by weight) | CuO (% by weight) |
|---|---|---|---|---|---|---|---|---|---|---|
| 49 | G22 | 15 | 0 | 64.92 | 0.35 | 1.9 | 2.75 | 0 | 15 | 0.08 |
| 50 | G22 | 17 | 0 | 68.12 | 0.8 | 3.5 | 6 | 0 | 4.5 | 0.08 |
| 51 | G22 | 12 | 0 | 69.32 | 0.38 | 2 | 2.75 | 0 | 13.5 | 0.05 |
| 52 | G22 | 15 | 0 | 64.4 | 0.6 | 3.5 | 4.5 | 0 | 12 | 0 |
| 53 | G22 | 15 | 63.45 | 0 | 0.75 | 3.5 | 5.25 | 0 | 12 | 0.05 |
| 54 | G22 | 5 | 0 | 59.42 | 1.4 | 6.6 | 9.5 | 0 | 18 | 0.08 |
| 55 | G22 | 12 | 0 | 60.42 | 1.4 | 6.6 | 9.5 | 0 | 10 | 0.08 |
| 56 | G22 | 12 | 52.75 | 14.4 | 0.75 | 3.45 | 4.55 | 0 | 12 | 0.1 |
| 57 | G22 | 12 | 0 | 69.55 | 0.52 | 2.63 | 4.27 | 0 | 11 | 0.03 |
| 58 | G22 | 15.5 | 0 | 63.5 | 0.4 | 0.9 | 1.5 | 0 | 18 | 0.2 |
| 59 | G22 | 13 | 0 | 61.92 | 0.8 | 3.8 | 5.4 | 0 | 15 | 0.08 |
| 60 | G22 | 10 | 0 | 62.13 | 1.42 | 6.75 | 9.5 | 0 | 10 | 0.2 |
| 61 | G22 | 19 | 0 | 63.24 | 0.4 | 0.95 | 1.33 | 0 | 15 | 0.08 |
| 62 | G22 | 20 | 0 | 57.17 | 0.4 | 1.8 | 2.6 | 0 | 18 | 0.03 |
| 63 | G22 | 13 | 61.92 | 0 | 0.8 | 3.8 | 5.4 | 0 | 15 | 0.08 |
| 64 | G22 | 6 | 0 | 61.55 | 1.4 | 6.5 | 9.5 | 0 | 15 | 0.05 |
| 65 | G22 | 14 | 0 | 68.42 | 0.8 | 3.8 | 0 | 5.4 | 7.5 | 0.08 |
| 66 | G22 | 13 | 0 | 61.92 | 0.8 | 3.8 | 0 | 5.4 | 15 | 0.08 |
| 67 | G22 | 14 | 60.92 | 0 | 0.8 | 3.8 | 0 | 5.4 | 15 | 0.08 |
| 68 | G22 | 17 | 0 | 47.55 | 1.405 | 6.575 | 9.265 | 0 | 18 | 0.205 |
| 69 | G22 | 12.5 | 0 | 61.705 | 1.415 | 6.7 | 10 | 0 | 7.5 | 0.18 |
| 70 | G22 | 12.5 | 0 | 60.32 | 1.43 | 6.7 | 9.45 | 0 | 9.5 | 0.1 |
| 71 | G22 | 15.5 | 0 | 60.15 | 1.2 | 5.65 | 7.77 | 0 | 9.5 | 0.23 |
| 72 | G22 | 11.75 | 0 | 61.87 | 1.5 | 6.7 | 9.25 | 0 | 8.85 | 0.08 |
| 73 | G22 | 20.5 | 0 | 60.37 | 0.75 | 3.35 | 4.45 | 0 | 10.5 | 0.08 |
| 74 | G22 | 10.75 | 0 | 61.38 | 1.42 | 6.75 | 0 | 9.5 | 10 | 0.2 |
| 75 | G22 | 19 | 63.24 | 0 | 0.4 | 0.95 | 0 | 1.33 | 15 | 0.08 |
| 76 | G22 | 10.5 | 0 | 60.495 | 1.425 | 6.8 | 9.45 | 0 | 11.25 | 0.08 |
| 77 | G22 | 10 | 0 | 61.2 | 0.75 | 3.5 | 4.5 | 0 | 20 | 0.05 |
| 78 | G22 | 12 | 0 | 61.35 | 1.35 | 6.25 | 8.75 | 0 | 10 | 0.3 |
| 79 | G22 | 12.45 | 69.32 | 0 | 0.39 | 2.125 | 2.815 | 0 | 12.85 | 0.05 |
| 80 | G22 | 16.81 | 47.55 | 0 | 1.405 | 6.575 | 9.265 | 0 | 18.2 | 0.195 |

TABLE 3-continued

| Sample Number | Glass Symbol | Glass (% by weight) | First Ceramic (% by weight) MgAl$_2$O$_4$ | First Ceramic (% by weight) Mg$_2$SiO$_4$ | Second Ceramic (% by weight) BaO | Second Ceramic (% by weight) TiO$_2$ | Second Ceramic (% by weight) RE$_2$O$_3$ Nd$_2$O$_3$ | Second Ceramic (% by weight) RE$_2$O$_3$ Sm$_2$O$_3$ | MnO (% by weight) | CuO (% by weight) |
|---|---|---|---|---|---|---|---|---|---|---|
| 81 | G22 | 11.55 | 0 | 60.27 | 0.75 | 3.6 | 5.25 | 0 | 18.5 | 0.08 |
| 82 | G22 | 16.8 | 0 | 61.55 | 1.43 | 0.97 | 1.3 | 0 | 17.9 | 0.05 |
| 83 | G22 | 16.55 | 0 | 47.5 | 1.415 | 6.725 | 9.45 | 0 | 18.18 | 0.18 |
| 84 | G22 | 12 | 69.5 | 0 | 0.5 | 2.7 | 4.25 | 0 | 11 | 0.05 |
| 85 | G22 | 16.55 | 47.455 | 0 | 1.415 | 6.75 | 9.45 | 0 | 18.2 | 0.18 |
| 86 | G22 | 10.5 | 0 | 61.7 | 1.42 | 6.7 | 0 | 10 | 9.5 | 0.18 |
| 87 | G22 | 16.8 | 0 | 62.58 | 0.4 | 0.97 | 0 | 1.3 | 17.9 | 0.05 |

Next, the slurry was formed into the shape of a sheet by a doctor blade method, and dried to obtain ceramic green sheets. The ceramic green sheets were used to prepare samples appropriately, and the relative permittivity ($\in_r$), Qf, temperature coefficient of capacitance (β), and insulation reliability were evaluated as shown in Tables 4 and 5.

More specifically, for the measurement of $\in_r$ and Qf, the ceramic green sheets were cut, stacked, and subjected to pressure bonding to prepare pressure-bonded bodies of 0.6 mm×50 mm×50 mm in dimensions. These bodies were subjected to firing at a temperature of 990° C. to obtain ceramic substrates as samples. These ceramic substrates were used to measure $\in_r$ and Qf by a cavity resonator method. In this case, the measurement frequency was adjusted to approximately 25 GHz.

This experimental example was aimed at obtaining a dielectric material with $\in_r$ of 15 or less. The sample with Qf less than 5000 was determined as a failure.

For the measurement of β and the evaluation on insulation reliability, after cutting the ceramic green sheets, a conductive paste containing Cu was printed onto the ceramic green sheets in order to form internal electrodes, and then through each step of stacking, pressure bonding, firing, and external electrode formation, laminated ceramic capacitors were obtained as samples. In the laminated ceramic capacitors, the distance between adjacent internal electrodes was 10 μm, and the area of the electrodes overlapped with each other was 4 mm□.

Then, for the laminated ceramic capacitors, the electrostatic capacitance was measured in the range of −40° C. to 85° C. to determine temperature coefficient of capacitance β with 20° C. regarded as a standard. The sample with β in excess of 150 ppm/K in terms of absolute value was determined as a failure.

In addition, for the laminated ceramic capacitors, the insulation resistance was measured after a test of applying DC 200 V for 100 hours under a temperature of 150° C., the capacitor with log(IR [Ω]) less than 11 after this test was determined as a failure, which is indicated by "X" in the column "Insulation Reliability" in Tables 4 and 5, whereas the capacitor with log(IR [Ω]) of 11 or more was determined as a pass, which is indicated by "◯" in the column "Insulation Reliability" in Tables 4 and 5.

It is to be noted that the insufficiently sintered sample is shown as "Unsintered" in the column of "Remarks" in Tables 4 and 5, whereas the sample with the glass unvitrified is shown as "Unvitrified" in the column of "Remarks", and these samples were not evaluated for each of $\in_r$, Qf, β, and insulation reliability. In addition, the reasons for the failures are briefly described in the column of "Remarks" for the failed samples in this experimental example.

TABLE 4

| Sample Number | $\in_r$ | Qf (GHz) | β (ppm/K) | Insulation Reliability | Remarks |
|---|---|---|---|---|---|
| 1* | — | — | — | — | Unsintered |
| 2* | — | — | — | — | Unsintered |
| 3 | 10 | 6300 | 125 | ◯ | |
| 4 | 11 | 6000 | 111 | ◯ | |
| 5 | 12 | 6300 | 135 | ◯ | |
| 6* | 12 | 5500 | 133 | X | Decreased Insulation Reliability |
| 7* | 13 | 5300 | 136 | X | Decreased Insulation Reliability |
| 8 | 15 | 5100 | 149 | ◯ | |
| 9 | 13 | 5100 | 149 | ◯ | |
| 10 | 10 | 5700 | 149 | X | |
| 11* | 15 | 5300 | 672 | ◯ | Deteriorated β |
| 12* | 13 | 5100 | 660 | ◯ | Deteriorated β |
| 13 | 11 | 6000 | 136 | ◯ | |
| 14 | 10 | 5800 | 128 | ◯ | |
| 15 | — | 5300 | 112 | ◯ | |
| 16 | 12 | 6600 | 121 | ◯ | |
| 17 | 12 | 5100 | 128 | ◯ | |
| 18* | — | — | — | — | Unsintered |
| 19 | 11 | 6100 | 128 | ◯ | |
| 20* | — | — | — | — | Unsintered |
| 21 | 10 | 6000 | 126 | ◯ | |
| 22* | — | — | — | — | Unsintered |
| 23 | 10 | 6000 | 122 | ◯ | |
| 24* | 12 | 5200 | 133 | X | Decreased Insulation Reliability |
| 25 | 13 | 6400 | 132 | ◯ | |
| 26 | 11 | 5400 | 112 | ◯ | |
| 27 | 9 | 7900 | 112 | ◯ | |
| 28 | 10 | 7800 | 114 | ◯ | |
| 29 | 12 | 6400 | 133 | ◯ | |
| 30 | 12 | 5500 | 139 | ◯ | |
| 31 | 11 | 6800 | 122 | ◯ | |
| 32 | 14 | 5400 | 149 | ◯ | |
| 33 | 12 | 5100 | 128 | ◯ | |
| 34 | 11 | 6100 | 114 | ◯ | |
| 35 | 10 | 5400 | 121 | ◯ | |
| 36 | 11 | 6000 | 128 | ◯ | |
| 37 | 10 | 6000 | 133 | ◯ | |
| 38 | 12 | 5600 | 149 | ◯ | |
| 39* | 12 | 5500 | 870 | ◯ | Deteriorated β |
| 40* | 12 | 5300 | 945 | ◯ | Deteriorated β |
| 41* | 11 | 5300 | 135 | X | Decreased Insulation Reliability |
| 42* | 15 | 5100 | 136 | X | Decreased Insulation Reliability |
| 43* | — | — | — | — | Unvitrified |
| 44* | — | — | — | — | Unvitrified |
| 45* | 11 | 6300 | 125 | X | Decreased Insulation Reliability |
| 46* | 13 | 5500 | 130 | X | Decreased Insulation Reliability |
| 47* | 10 | 5500 | 131 | X | Decreased Insulation Reliability |

TABLE 4-continued

| Sample Number | $\epsilon_r$ | Qf (GHz) | β (ppm/K) | Insulation Reliability | Remarks |
|---|---|---|---|---|---|
| 48* | 14 | 5100 | 135 | X | Decreased Insulation Reliability |

TABLE 5

| Sample Number | $\epsilon_r$ | Qf (GHz) | β (ppm/K) | Insulation Reliability | Remarks |
|---|---|---|---|---|---|
| 49* | 10 | 6300 | 720 | ○ | Deteriorated β |
| 50* | — | — | — | — | Unsintered |
| 51 | 11 | 7200 | 148 | ○ | |
| 52 | 10 | 5200 | 145 | ○ | |
| 53 | 8 | 7800 | 140 | ○ | |
| 54* | — | — | — | — | Unsintered |
| 55 | 15 | 6800 | 114 | ○ | |
| 56 | 12 | 6200 | 126 | ○ | |
| 57* | 9 | 6000 | 175 | ○ | Deteriorated β |
| 58* | 9 | 5800 | 692 | X | Deteriorated β |
| 59 | 9 | 8000 | 110 | ○ | |
| 60 | 15 | 7000 | 115 | ○ | |
| 61 | 8 | 6800 | 142 | ○ | |
| 62 | 9 | 5400 | 132 | ○ | |
| 63 | 11 | 5800 | 138 | ○ | |
| 64 | 14 | 6300 | 135 | ○ | |
| 65 | 13 | 5700 | 128 | ○ | |
| 66 | 9 | 6100 | 125 | ○ | |
| 67 | 12 | 5400 | 132 | ○ | |
| 68 | 13 | 5700 | 130 | ○ | |
| 69* | 12 | 6500 | 135 | X | Decreased Insulation Reliability |
| 70 | 12 | 6400 | 146 | ○ | |
| 71 | 9 | 5400 | 146 | ○ | |
| 72* | 12 | 6000 | 146 | X | Decreased Insulation Reliability |
| 73* | 10 | 6000 | 144 | X | Decreased Insulation Reliability |
| 74 | 12 | 7400 | 138 | ○ | |
| 75 | 10 | 5300 | 141 | ○ | |
| 76* | 12 | 5300 | 140 | X | Decreased Insulation Reliability |
| 77* | 11 | 5300 | 175 | ○ | Deteriorated β |
| 78* | 12 | 5200 | 146 | X | Decreased Insulation Reliability |
| 79 | 9 | 7200 | 147 | ○ | |
| 80 | 13 | 5400 | 140 | ○ | |
| 81 | 9 | 6500 | 148 | ○ | |
| 82* | 9 | 6600 | 250 | ○ | Deteriorated β |
| 83* | 14 | 4600 | 180 | ○ | Decreased Qf |
| 84* | 9 | 5200 | 195 | ○ | Deteriorated β |
| 85* | 12 | 4100 | 150 | ○ | Decreased Qf |
| 86* | 12 | 5500 | 140 | X | Decreased Insulation Reliability |
| 87* | 10 | 5200 | 285 | ○ | Deteriorated β |

In Tables 4 and 5, the sample numbers are marked with * for the samples determined as failures in this experimental example.

The following is determined from Tables 1 to 5.

First, the samples 1 to 48 listed in Tables 2 and 4 will be first considered. Any one of all the glasses G1 to G36 listed in Table 1 was used for the samples 1 to 48. It is to be noted that the content of the "glass" was made constant to be "13.00% by weight" for all of the samples 1 to 48.

Samples 1 and 2 were not sufficiently sintered. This is assumed to be because of the use of the glass G1 with the Li$_2$O content lower than 0.3% by weight.

Samples 6 and 7 decreased in insulation reliability. This is assumed to be because of the use of the glass G5 with the Li$_2$O content higher than 7.5% by weight.

Samples 11 and 12 deteriorated in temperature coefficient of capacitance β. This is assumed to be because of the use of the glass G8 with the alkaline-earth metal content lower than 44.0% by weight.

Sample 18 was not sufficiently sintered. This is assumed to be because of the use of the glass G13 with the alkaline-earth metal content higher than 69.0% by weight.

Sample 20 was not sufficiently sintered. This is assumed to be because of the use of the glass G15 with the B$_2$O$_3$ content lower than 10.0% by weight.

Sample 22 was not sufficiently sintered. This is assumed to be because of the use of the glass G17 with the SiO$_2$ content higher than 30.0% by weight.

Sample 24 decreased in insulation reliability. This is assumed to be because of the use of the glass G19 with the B$_2$O$_3$ content higher than 20.0% by weight.

Samples 39 and 40 deteriorated in temperature coefficient of capacitance β. This is assumed to be because of the use of the glass G32 with the MgO content lower than 0.1% by weight.

Samples 41 and 42 decreased in insulation reliability. This is assumed to be because of the use of the glass G33 with the MgO content higher than 5.5% by weight.

Samples 43 and 44 were not vitrified. This is assumed to be because of the use of the glass G34 with the SiO$_2$ content lower than 14.2% by weight.

Samples 45 and 46 decreased in insulation reliability. This is assumed to be because of the use of the glass G35 with the Al$_2$O$_3$ content lower than 0.5% by weight.

Samples 47 and 48 decreased in insulation reliability. This is assumed to be because of the use of the glass G36 with the Al$_2$O$_3$ content higher than 4.0% by weight.

The samples 3 to 5, 8 to 10, 13 to 17, 19, 21, 23, and 25 to 38 shown in Tables 2 and 4, other than samples 1, 2, 6, 7, 11, 12, 18, 20, 22, 24, and 39 to 48, achieved favorable results for Qf, β, and insulation reliability.

This is assumed to be because of the use of any one of the glasses G2, G3, G4, G6, G7, G9, G10, G11, G12, G14, G16, G18, G20, G21, G22, G23, G24, G25, G26, G27, G28, G29, G30, and G31 which satisfy the conditions of: the alkaline-earth metal content of 44.0 to 69.0% by weight; the SiO$_2$ content of 14.2 to 30.0% by weight; the B$_2$O$_3$ content of 10.0 to 20.0% by weight; the Al$_2$O$_3$ content of 0.5 to 4.0% by weight; the Li$_2$O content of 0.3 to 7.5% by weight; and the MgO content of 0.1 to 5.5% by weight.

As for $\epsilon_r$, all of the samples shown in Tables 2 and 4, except for the samples with the evaluation results of "Unsintered" or "Unvitrified", achieved a value of 15 or less.

Next, the samples 49 to 87 shown in Tables 3 and 5 will be considered. For the samples 49 to 87, the respective contents of "Glass", "First Ceramic", "Second Ceramic", "MnO", and "CuO" were varied while the glass G 22 shown in Table 1 was used as the "Glass".

Sample 49 deteriorated in temperature coefficient of capacitance β. This is assumed to be because the BaO content was lower than 0.38% by weight in the second ceramic.

Sample 50 was not sufficiently sintered. This is assumed to be because the MnO content was lower than 7.5% by weight.

Sample 54 was not sufficiently sintered. This is assumed to be because the glass content was lower than 6% by weight.

Sample 57 deteriorated in temperature coefficient of capacitance β. This is assumed to be because the content of Mg$_2$SiO$_4$ as the first ceramic was higher than 69.32% by weight.

Sample 58 deteriorated in temperature coefficient of capacitance β. This is assumed to be because the TiO$_2$ content was lower than 0.95% by weight in the second ceramic.

Sample 69 decreased in insulation reliability. This is assumed to be because the content of $Nd_2O_3$ as $RE_2O_3$ was higher than 9.5% by weight in the second ceramic.

Sample 72 decreased in insulation reliability. This is assumed to be because the BaO content was higher than 1.43% by weight in the second ceramic.

Sample 73 decreased in insulation reliability. This is assumed to be because the glass content was higher than 20% by weight.

Sample 76 decreased in insulation reliability. This is assumed to be because the $TiO_2$ content was higher than 6.75% by weight in the second ceramic.

Sample 77 deteriorated in temperature coefficient of capacitance β. This is assumed to be because the MnO content was higher than 18.5% by weight.

Sample 78 decreased in insulation reliability. This is assumed to be because the CuO content was higher than 0.23% by weight.

Sample 82 deteriorated in temperature coefficient of capacitance β. This is assumed to be because the content of $Nd_2O_3$ as $RE_2O_3$ was lower than 1.33% by weight in the second ceramic.

Sample 83 decreased in Qf. This is assumed to be because the content of $Mg_2SiO_4$ as the first ceramic was lower than 47.55% by weight.

Sample 84 deteriorated in temperature coefficient of capacitance β. This is assumed to be because the content of $MgAl_2O_4$ as the first ceramic was higher than 69.32% by weight.

Sample 85 decreased in Qf. This is assumed to be because the content of $MgAl_2O_4$ as the first ceramic was lower than 47.55% by weight.

Sample 86 decreased in insulation reliability. This is assumed to be because the content of $Sm_2O_3$ as $RE_2O_3$ was higher than 9.5% by weight in the second ceramic.

Sample 87 deteriorated in temperature coefficient of capacitance β. This is assumed to be because the content of $Sm_2O_3$ as $RE_2O_3$ was lower than 1.33% by weight in the second ceramic.

The samples 51 to 53, 55, 56, 59 to 68, 70, 71, 74, 75, and 79 to 81 shown in Tables 3 and 5, other than the samples 49, 50, 54, 57, 58, 69, 72, 73, 76 to 78, and 82 to 87 mentioned above, achieved favorable results for Qf, β, and insulation reliability.

This is assumed to be because of the satisfied conditions of: first ceramic content of 47.55 to 69.32% by weight; glass content of 6 to 20% by weight; MnO content of 7.5 to 18.5% by weight; BaO content of 0.38 to 1.43% by weight; $RE_2O_3$ content of 1.33 to 9.5% by weight; $TiO_2$ content of 0.95 to 6.75% by weight; and CuO content of 0.23% by weight or less.

As for $\in_r$, all of the samples shown in Tables 3 and 5, except for the samples with the evaluation results of "Unsintered", achieved a value of 15 or less.

It is to be noted that while $Nd_2O_3$ and $Sm_2O_3$ were used as $RE_2O_3$ in the second ceramic in Experimental Example 1, it has been confirmed that similar tendencies are also shown when other rare-earth elements are used.

Experimental Example 2

In Experimental Example 2, glass ceramics for the low dielectric constant ceramic layers were prepared as in Experimental Example 1, and in particular, the influences on the low dielectric constant glass ceramics were examined by the addition of at least one of $Mg_2Al_4Si_5O_{18}$ and $BaAl_2Si_2O_8$.

Respective powders of spinel compound: $MgAl_2O_4$ and forsterite compound: $Mg_2SiO_4$, BaO, $TiO_2$, $Nd_2O_3$ and $Sm_2O_3$ as $RE_2O_3$, MnO, as well as CuO were prepared as in the case of Experimental Example 1.

In addition, in this Experimental Example 2, as shown in Table 6, $MgCO_3$, $Al_2O_3$, and $SiO_2$ were blended in predetermined proportions, and subjected to calcination, and wet grinding to prepare a powder of cordierite compound: $Mg_2Al_4Si_5O_{18}$. In addition, also as shown in Table 6, $BaCO_3$, $Al_2O_3$, and $SiO_2$ were blended in predetermined proportions, and subjected to calcination, and wet grinding to prepare a powder of celsian compound: $BaAl_2Si_2O_8$.

Furthermore, as shown in Table 7, respective powders of BaO, MgO, $Al_2O_3$, and $SiO_2$ were prepared as oxides for providing elements constituting the cordierite compound: $Mg_2Al_4Si_5O_{18}$ and the celsian compound: $BaAl_2Si_2O_8$, because the oxides mentioned above were not enough.

Next, respective powders of the glass shown in Table 1, $MgAl_2O_4$, $Mg_2SiO_4$, BaO, $TiO_2$, $Nd_2O_3$ and $Sm_2O_3$ as $RE_2O_3$, MnO, and CuO were blended for the compositions shown in Tables 6 and 7. Furthermore, respective powders of $Mg_2Al_4Si_5O_{18}$ and $BaAl_2Si_2O_8$ were blended for the samples listed in Table 6. In addition, respective powders of MgO, $Al_2O_3$, and $SiO_2$ were further blended for the sample 112 listed in Table 7. For the sample 113 listed in Table 7, respective powders of MgO, $Al_2O_3$, and $SiO_2$ were further blended, and the amount of the BaO powder was increased. Then, these powders mere mixed, and an organic solvent and a binder were then added to the mixture to prepare slurry.

TABLE 6

| Sample Number | Symbol | Glass (% by weight) | First Ceramic (% by weight) | | Second Ceramic (% by weight) | | | | | | | |
|---|---|---|---|---|---|---|---|---|---|---|---|---|
| | | | | | | | RE$_2$O$_3$ | | | | | |
| | | | $MgAl_2O_4$ | $Mg_2SiO_4$ | BaO | $TiO_2$ | $Nd_2O_3$ | $Sm_2O_3$ | MnO | CuO | $Mg_2Al_4Si_5O_{18}$ | $BaAl_2Si_2O_8$ |
| 101* | G30 | 13 | 0 | 61.92 | 0.8 | 3.8 | 5.4 | 0 | 15 | 0.08 | 0 | 0 |
| 102 | G30 | 13 | 0 | 51.92 | 0.8 | 3.8 | 5.4 | 0 | 15 | 0.08 | 10 | 0 |
| 103* | G11 | 13 | 0 | 52.31 | 1.42 | 6.74 | 4.5 | 5 | 15 | 0.03 | 2 | 0 |
| 104 | G22 | 13 | 62.87 | 0 | 0.6 | 2.5 | 3 | 0 | 15 | 0.03 | 3 | 0 |
| 105 | G28 | 12 | 0 | 47.82 | 0.6 | 2.5 | 3 | 0 | 14 | 0.08 | 20 | 0 |
| 106* | G20 | 11.25 | 0 | 47.57 | 0.6 | 2.5 | 3 | 0 | 14 | 0.08 | 21 | 0 |
| 107* | G14 | 13 | 0 | 58.62 | 1.2 | 4 | 6.1 | 0 | 15 | 0.08 | 0 | 2 |
| 108 | G22 | 13 | 0 | 61.37 | 0.6 | 2.5 | 3 | 0 | 16.5 | 0.03 | 0 | 3 |
| 109 | G22 | 12.5 | 47.85 | 0 | 0.6 | 2.5 | 3 | 0 | 13.5 | 0.05 | 0 | 20 |
| 110* | G27 | 12.5 | 0 | 47.87 | 0.6 | 2.5 | 3 | 0 | 12.5 | 0.03 | 0 | 21 |
| 111 | G22 | 13 | 10 | 41.92 | 0.8 | 3.8 | 5.4 | 0 | 15 | 0.08 | 6 | 4 |

TABLE 7

| Sample Number | Glass Symbol | (% by weight) | First Ceramic MgAl$_2$O$_4$ | Mg$_2$SiO$_4$ | Second Ceramic BaO | TiO$_2$ | RE$_2$O$_3$ Nd$_2$O$_3$ | Sm$_2$O$_3$ | MnO | CuO | MgO | Al$_2$O$_3$ | SiO$_2$ |
|---|---|---|---|---|---|---|---|---|---|---|---|---|---|
| 112 | G22 | 12 | 0 | 49.42 | 0.8 | 3.8 | 5.4 | 0 | 16.39 | 0.08 | 1.67 | 4.22 | 6.22 |
| 113 | G30 | 13 | 0 | 53.85 | 4.78 | 3.2 | 4.2 | 0 | 15 | 0.05 | 0 | 2.72 | 3.2 |

Thereafter, in the same manner as in the case of Experimental Example 1, samples were prepared, and evaluated for relative permittivity ($\epsilon_r$), Qf, temperature coefficient of capacitance ($\beta$), and insulation reliability as shown in Table 8. This experimental example was aimed at obtaining a dielectric material with lower $\epsilon_r$, such as $\epsilon_r$ of 8 or less. It is to be noted that, more strictly, the sample with $\beta$ of 100 ppm/K or more in terms of absolute value was determined as a failure.

Further, the reasons for the failures are briefly described in the column of "Remarks" of Table 8 for the failed samples in this experimental example.

TABLE 8

| Sample Number | $\epsilon_r$ | Qf (GHz) | $\beta$ (ppm/K) | Insulation Reliability | Remarks |
|---|---|---|---|---|---|
| 101* | 10 | 6000 | 133 | ○ | $\epsilon$ large, $\beta$ large |
| 102 | 7 | 6200 | 98 | ○ | |
| 103* | 12 | 5200 | 125 | ○ | $\epsilon$ large, $\beta$ large |
| 104 | 8 | 5400 | 98 | ○ | |
| 105 | 6 | 5100 | 85 | ○ | |
| 106* | 6 | 4200 | 75 | ○ | Decreased Qf |
| 107* | 10 | 5200 | 115 | ○ | $\epsilon$ large, $\beta$ large |
| 108 | 8 | 5200 | 98 | ○ | |
| 109 | 7 | 5500 | 88 | ○ | |
| 110* | 7 | 4000 | 75 | ○ | Decreased Qf |
| 111 | 7 | 5400 | 91 | ○ | |
| 112 | 7 | 5500 | 88 | ○ | |
| 113 | 8 | 5400 | 90 | ○ | |

In Table 8, the sample numbers are marked with * for the samples determined as failures in this experimental example.

The following is determined from Tables 6 to 8.

In comparison between the samples 102, 104 to 106, and 108 to 113 containing 3.0% by weight or more of at least one of Mg$_2$Al$_4$Si$_8$O$_{18}$ and BaAl$_2$Si$_2$O$_8$, and the samples 101, 103, and 107 containing none of them, the former achieves lower $\epsilon_r$, such as 8 or less, and also results in a temperature coefficient of capacitance $\beta$ less than 100 ppm/K in terms of absolute value.

In addition, as can be seen from the samples 112 and 113, the composite oxides such as Mg$_2$Al$_4$Si$_5$O$_{18}$ and BaAl$_2$Si$_2$O$_8$ achieve similar effects even with the addition of the single oxides as materials for the composite oxides.

On the other hand, in the case of the samples 106 and 110 containing more than 20.0% by weight of at least one of Mg$_2$Al$_4$Si$_8$O$_{18}$ and BaAl$_2$Si$_2$O$_8$, decreases in Qf were observed.

Experimental Example 3

In Experimental Example 3, evaluations were made on single bodies of glass ceramics for high dielectric constant ceramic layers.

Respective powders of spinel compound: MgAl$_2$O$_4$ and forsterite compound: Mg$_2$SiO$_4$ as the first ceramic, BaO, TiO$_2$, and Nd$_2$O$_3$ as RE$_2$O$_3$ to serve as the second ceramic, MnO, as well as CuO were prepared as in the case of Experimental Example 1.

Next, for the compositions shown in Tables 9 and 10, respective powders of the glass shown in Table 1, MgAl$_2$O$_4$, Mg$_2$SiO$_4$, BaO, TiO$_2$, Nd$_2$O$_3$, MnO, and CuO were blended and mixed, and an organic solvent and a binder were then added to the mixture to prepare slurry.

TABLE 9

| Sample Number | Glass Symbol | Glass (% by weight) | First Ceramic (% by weight) MgAl$_2$O$_4$ | Mg$_2$SiO$_4$ | Second Ceramic (% by weight) BaO (% by weight) | TiO$_2$ (% by weight) | Nd$_2$O$_3$ (% by weight) | MnO (% by weight) | CuO (% by weight) |
|---|---|---|---|---|---|---|---|---|---|
| 201 | G1 | 9 | 3 | 3 | 5.5 | 28 | 48.1 | 2.8 | 0.6 |
| 202 | G2 | 9 | 3 | 3 | 5.5 | 28 | 48.1 | 2.8 | 0.6 |
| 203 | G3 | 9 | 3 | 3 | 5.5 | 28 | 48.1 | 2.8 | 0.6 |
| 204 | G4 | 9 | 3 | 3 | 5.5 | 28 | 48.1 | 2.8 | 0.6 |
| 205 | G5 | 9 | 3 | 3 | 5.5 | 28 | 48.1 | 2.8 | 0.6 |
| 206 | G6 | 9 | 3 | 3 | 5.5 | 28 | 48.1 | 2.8 | 0.6 |
| 207 | G7 | 9 | 3 | 3 | 5.5 | 28 | 48.1 | 2.8 | 0.6 |
| 208 | G8 | 9 | 3 | 3 | 5.5 | 28 | 48.1 | 2.8 | 0.6 |
| 209 | G9 | 9 | 3 | 3 | 5.5 | 28 | 48.1 | 2.8 | 0.6 |
| 210 | G10 | 9 | 3 | 3 | 5.5 | 28 | 48.1 | 2.8 | 0.6 |
| 211 | G11 | 9 | 3 | 3 | 5.5 | 28 | 48.1 | 2.8 | 0.6 |
| 212 | G12 | 9 | 3 | 3 | 5.5 | 28 | 48.1 | 2.8 | 0.6 |
| 213 | G13 | 9 | 3 | 3 | 5.5 | 28 | 48.1 | 2.8 | 0.6 |
| 214 | G14 | 9 | 3 | 3 | 5.5 | 28 | 48.1 | 2.8 | 0.6 |
| 215 | G15 | 9 | 3 | 3 | 5.5 | 28 | 48.1 | 2.8 | 0.6 |
| 216 | G16 | 9 | 3 | 3 | 5.5 | 28 | 48.1 | 2.8 | 0.6 |
| 217 | G17 | 9 | 3 | 3 | 5.5 | 28 | 48.1 | 2.8 | 0.6 |
| 218 | G18 | 9 | 3 | 3 | 5.5 | 28 | 48.1 | 2.8 | 0.6 |

TABLE 9-continued

| Sample Number | Glass Symbol | Glass (% by weight) | First Ceramic (% by weight) MgAl$_2$O$_4$ | First Ceramic (% by weight) Mg$_2$SiO$_4$ | Second Ceramic (% by weight) BaO | Second Ceramic (% by weight) TiO$_2$ | Second Ceramic (% by weight) Nd$_2$O$_3$ | Second Ceramic (% by weight) MnO | Second Ceramic (% by weight) CuO |
|---|---|---|---|---|---|---|---|---|---|
| 219 | G19 | 9 | 3 | 3 | 5.5 | 28 | 48.1 | 2.8 | 0.6 |
| 220 | G20 | 9 | 3 | 3 | 5.5 | 28 | 48.1 | 2.8 | 0.6 |
| 221 | G21 | 9 | 3 | 3 | 5.5 | 28 | 48.1 | 2.8 | 0.6 |
| 222 | G22 | 9 | 3 | 3 | 5.5 | 28 | 48.1 | 2.8 | 0.6 |
| 223 | G23 | 9 | 3 | 3 | 5.5 | 28 | 48.1 | 2.8 | 0.6 |
| 224 | G24 | 9 | 3 | 3 | 5.5 | 28 | 48.1 | 2.8 | 0.6 |
| 225 | G25 | 9 | 3 | 3 | 5.5 | 28 | 48.1 | 2.8 | 0.6 |
| 226 | G26 | 9 | 3 | 3 | 5.5 | 28 | 48.1 | 2.8 | 0.6 |
| 227 | G27 | 9 | 3 | 3 | 5.5 | 28 | 48.1 | 2.8 | 0.6 |
| 228 | G28 | 9 | 3 | 3 | 5.5 | 28 | 48.1 | 2.8 | 0.6 |
| 229 | G29 | 9 | 3 | 3 | 5.5 | 28 | 48.1 | 2.8 | 0.6 |
| 230 | G30 | 9 | 3 | 3 | 5.5 | 28 | 48.1 | 2.8 | 0.6 |
| 231 | G31 | 9 | 3 | 3 | 5.5 | 28 | 48.1 | 2.8 | 0.6 |
| 232 | G32 | 9 | 3 | 3 | 5.5 | 28 | 48.1 | 2.8 | 0.6 |
| 233 | G33 | 9 | 3 | 3 | 5.5 | 28 | 48.1 | 2.8 | 0.6 |
| 234 | G34 | 9 | 3 | 3 | 5.5 | 28 | 48.1 | 2.8 | 0.6 |
| 235 | G35 | 9 | 3 | 3 | 5.5 | 28 | 48.1 | 2.8 | 0.6 |
| 236 | G36 | 9 | 3 | 3 | 5.5 | 28 | 48.1 | 2.8 | 0.6 |

TABLE 10

| Sample Number | Glass Symbol | Glass (% by weight) | First Ceramic (% by weight) MgAl$_2$O$_4$ | First Ceramic (% by weight) Mg$_2$SiO$_4$ | Second Ceramic (% by weight) BaO | Second Ceramic (% by weight) TiO$_2$ | Second Ceramic (% by weight) Nd$_2$O$_3$ | Second Ceramic (% by weight) MnO | Second Ceramic (% by weight) CuO |
|---|---|---|---|---|---|---|---|---|---|
| 237 | G22 | 5 | 5 | 1 | 18.3 | 28 | 38.5 | 3.8 | 0.4 |
| 238 | G22 | 5 | 5 | 1 | 1.5 | 32.5 | 50.8 | 3.8 | 0.4 |
| 239 | G22 | 5 | 5 | 1 | 2.5 | 26.4 | 55.9 | 3.8 | 0.4 |
| 240 | G22 | 5 | 5 | 1 | 12.8 | 10.5 | 61.5 | 3.8 | 0.4 |
| 241 | G22 | 5 | 5 | 1 | 15.7 | 11.2 | 57.9 | 3.8 | 0.4 |
| 242 | G22 | 5 | 5 | 1 | 12.7 | 36.4 | 35.7 | 3.8 | 0.4 |
| 243 | G22 | 5 | 5 | 1 | 13.2 | 38.3 | 33.3 | 3.8 | 0.4 |
| 244 | G22 | 5 | 5 | 1 | 6.1 | 13.4 | 65.3 | 3.8 | 0.4 |
| 245 | G22 | 3 | 1 | 0 | 4.4 | 20.5 | 68.1 | 2.4 | 0.6 |
| 246 | G22 | 3.5 | 0 | 1 | 3.5 | 30 | 59 | 2.4 | 0.6 |
| 247 | G22 | 11 | 7 | 8 | 4.3 | 22.7 | 38 | 8 | 1 |
| 248 | G22 | 14 | 0 | 15 | 8.9 | 26.5 | 24.6 | 10 | 1 |
| 249 | G22 | 15 | 0 | 15 | 6.5 | 30.5 | 22 | 10 | 1 |
| 250 | G22 | 2 | 3 | 3 | 10.7 | 28.2 | 49.7 | 2.8 | 0.6 |
| 251 | G22 | 3 | 3 | 3 | 10.7 | 28.2 | 48.7 | 2.8 | 0.6 |
| 252 | G22 | 8 | 3 | 3 | 10.7 | 28.2 | 43.7 | 2.8 | 0.6 |
| 253 | G22 | 12 | 3 | 3 | 10.7 | 28.2 | 39.7 | 2.8 | 0.6 |
| 254 | G21 | 15 | 3 | 3 | 10.7 | 28.2 | 36.7 | 2.8 | 0.6 |
| 255 | G22 | 17 | 3 | 3 | 10.7 | 28.2 | 34.7 | 2.8 | 0.6 |
| 256 | G22 | 5 | 17 | 0 | 10.7 | 28.2 | 35.7 | 2.8 | 0.6 |
| 257 | G22 | 5 | 15 | 0 | 10.7 | 28.2 | 37.7 | 2.8 | 0.6 |
| 258 | G22 | 5 | 10 | 0 | 10.7 | 28.2 | 42.7 | 2.8 | 0.6 |
| 259 | G22 | 5 | 0.5 | 0 | 10.7 | 28.2 | 52.2 | 2.8 | 0.6 |
| 260 | G22 | 5 | 0 | 17 | 10.7 | 28.2 | 35.7 | 2.8 | 0.6 |
| 261 | G22 | 5 | 0 | 15 | 10.7 | 28.2 | 37.7 | 2.8 | 0.6 |
| 262 | G22 | 5 | 0 | 10 | 10.7 | 28.2 | 42.7 | 2.8 | 0.6 |
| 263 | G22 | 5 | 0 | 0.5 | 10.7 | 28.2 | 52.2 | 2.8 | 0.6 |
| 264 | G22 | 5 | 3 | 3 | 10.7 | 28.2 | 48.5 | 1 | 0.6 |
| 265 | G22 | 5 | 3 | 3 | 10.7 | 28.2 | 47.8 | 2.3 | 0 |
| 266 | G22 | 5 | 3 | 3 | 10.7 | 28.2 | 37.5 | 12 | 0.6 |
| 267 | G21 | 5 | 3 | 3 | 10.7 | 28.2 | 47.3 | 2.8 | 0 |
| 268 | G22 | 5 | 3 | 3 | 10.7 | 28.2 | 47.1 | 2.8 | 0.2 |
| 269 | G22 | 5 | 3 | 3 | 10.7 | 28.2 | 46.1 | 2.8 | 1.2 |
| 270 | G22 | 5 | 3 | 3 | 10.7 | 28.2 | 45.8 | 2.8 | 1.5 |
| 271 | G22 | 5 | 7 | 8 | 8.7 | 25.2 | 37.1 | 8 | 1 |
| 272 | G22 | 8 | 3 | 3 | 10.4 | 27.4 | 42.6 | 5 | 0.6 |
| 273 | G22 | 12 | 3 | 3 | 10 | 26.7 | 37.7 | 7 | 0.6 |

Thereafter, in the same manner as in the case of Experimental Example 1, samples were prepared, and evaluated for relative permittivity ($\epsilon_r$), Qf, temperature coefficient of capacitance ($\beta$), and insulation reliability as shown in Tables 11 and 12. This experimental example was aimed at obtaining a dielectric material with $\epsilon_r$ of 30 or more. The sample with Qf less than 5000 GHz was determined as a failure, whereas the sample with $\beta$ in excess of 150 ppm/K in terms of absolute value was determined as a failure.

It is to be noted that the insufficiently sintered sample is shown as "Unsintered" in the column of "Remarks" in Tables 11 and 12, whereas the sample with the glass unvitrified is shown as "Unvitrified" in the column of "Remarks", and these samples were not evaluated for each of $\epsilon_r$, Qf, $\beta$, and insulation reliability. In addition, the reasons for the failures are briefly described in the column of "Remarks" for the failed samples in this experimental example.

TABLE 11

| Sample Number | $\epsilon_r$ | Qf (GHz) | $\beta$ (ppm/K) | Insulation Reliability | Remarks |
|---|---|---|---|---|---|
| 201* | — | — | — | — | Unsintered |
| 202 | 43 | 6600 | −58 | ○ | |
| 203 | 45 | 6400 | −30 | ○ | |
| 204 | 35 | 5800 | −22 | ○ | |
| 205* | 51 | 5500 | −59 | X | Decreased Insulation Reliability |
| 206 | 38 | 6600 | −15 | ○ | |
| 207 | 38 | 6800 | 24 | ○ | |
| 208* | 28 | 6100 | 55 | X | $\epsilon$ low, Decreased Insulation Reliability |
| 209 | 34 | 6300 | 20 | ○ | |
| 210 | 32 | 6500 | 44 | ○ | |
| 211 | 43 | 6600 | 47 | ○ | |
| 212 | 40 | 6600 | −24 | ○ | |
| 213* | — | — | — | — | Unsintered |
| 214 | 42 | 6300 | −12 | ○ | |
| 215* | — | — | — | — | Unsintered |
| 216 | 44 | 6000 | 38 | ○ | |
| 217* | — | — | — | — | Unsintered |
| 218 | 39 | 6200 | 38 | ○ | |
| 219* | 44 | 6200 | 38 | X | Decreased Insulation Reliability |
| 220 | 41 | 6000 | −5 | ○ | |
| 221 | 35 | 9600 | −55 | ○ | |
| 222 | 41 | 9800 | 25 | ○ | |
| 223 | 43 | 2000 | −59 | ○ | |
| 224 | 38 | 6400 | −39 | ○ | |
| 225 | 43 | 6700 | −55 | ○ | |
| 226 | 42 | 7200 | 38 | ○ | |
| 227 | 41 | 7000 | −45 | ○ | |
| 228 | 44 | 7400 | 49 | ○ | |
| 229 | 41 | 6500 | −25 | ○ | |
| 230 | 38 | 7500 | 38 | ○ | |
| 231 | 41 | 7400 | −29 | ○ | |
| 232* | 46 | 2300 | −22 | ○ | Decreased Qf |
| 233* | 45 | 5600 | 59 | X | Decreased Insulation Reliability |
| 234* | — | — | — | — | Unvitrified |
| 235* | 46 | 5700 | 58 | X | Decreased Insulation Reliability |
| 236* | 48 | 5200 | 58 | X | Decreased Insulation Reliability |

TABLE 12

| Sample Number | $\epsilon_r$ | Qf (GHz) | $\beta$ (ppm/K) | Insulation Reliability | Remarks |
|---|---|---|---|---|---|
| 237* | 47 | 6200 | −25 | X | Decreased Insulation Reliability |
| 238* | 16 | 6600 | −58 | ○ | $\epsilon$ low |
| 239 | 32 | 6400 | −30 | ○ | |
| 240* | 35 | 5800 | −22 | X | Decreased Insulation Reliability |
| 241 | 51 | 6500 | −67 | ○ | |
| 242 | 48 | 6200 | −72 | ○ | |
| 243* | 15 | 5800 | 24 | ○ | $\epsilon$ low |
| 244 | 36 | 5100 | 35 | ○ | |
| 245* | — | — | — | — | Unsintered |
| 246 | 36 | 6100 | −28 | ○ | |
| 247 | 41 | 6200 | 44 | ○ | |
| 248 | 44 | 6300 | 38 | ○ | |
| 249* | 25 | 6000 | −5 | X | $\epsilon$ low |
| 250* | 34 | — | — | — | Unsintered |
| 251 | 32 | 5500 | 44 | ○ | |
| 252 | 40 | 6600 | −24 | ○ | |
| 253 | 42 | 5800 | −27 | ○ | |
| 254 | — | — | — | ○ | |
| 255* | 42 | 6800 | 54 | X | Decreased Insulation Reliability |
| 256* | 35 | 5100 | 180 | ○ | Deteriorated $\beta$ |
| 257 | 39 | 5000 | 35 | ○ | |
| 258 | 43 | 5000 | −59 | ○ | |
| 259* | 33 | 5100 | −195 | ○ | Deteriorated $\beta$ |
| 260* | 33 | 6100 | 155 | ○ | Deteriorated $\beta$ |
| 261 | 32 | 6100 | −28 | ○ | |
| 262 | 39 | 5900 | −24 | ○ | |
| 263* | 37 | 6500 | −180 | ○ | Deteriorated $\beta$ |
| 264* | — | 5600 | 45 | X | Decreased Insulation Reliability |
| 265 | 45 | 6400 | 31 | ○ | |
| 266* | 34 | 1800 | 12 | ○ | Decreased Qf |
| 267 | 42 | 6300 | 27 | ○ | |
| 268 | 47 | 6200 | 42 | ○ | |
| 269 | 36 | 6700 | 37 | ○ | |
| 270* | 41 | 6300 | −30 | X | Decreased Insulation Reliability |
| 271 | 42 | 6700 | 42 | ○ | |
| 272 | 39 | 6200 | −26 | ○ | |
| 273 | 41 | 5500 | −29 | ○ | |

In Tables 11 and 12, the sample numbers are marked with * for the samples determined as failures in this experimental example.

The following is determined from Tables 9 to 12.

First, the samples 201 to 236 shown in Tables 9 and 11 will be considered. Any one of all the glass G1 to G36 listed in Table 1 was used for the samples 201 to 236. It is to be noted that the content of the "glass" was made constant to be "9% by weight" for all of the samples 201 to 236.

Sample 201 was not sufficiently sintered. This is assumed to be because of the use of the glass G1 with the $Li_2O$ content lower than 0.3% by weight.

Sample 205 decreased in insulation reliability. This is assumed to be because of the use of the glass G5 with the $Li_2O$ content higher than 7.5% by weight.

Sample 208 with low $\epsilon_r$ decreased in insulation reliability. This is assumed to be because of the use of the glass G8 with the alkaline-earth metal content lower than 44.0% by weight.

Sample 213 was not sufficiently sintered. This is assumed to be because of the use of the glass G13 with the alkaline-earth metal content higher than 69.0% by weight.

Sample 215 was not sufficiently sintered. This is assumed to be because of the use of the glass G15 with the $B_2O_3$ content lower than 10.0% by weight.

Sample 217 was not sufficiently sintered. This is assumed to be because of the use of the glass G17 with the $SiO_2$ content higher than 30.0% by weight.

Sample 219 decreased in insulation reliability. This is assumed to be because of the use of the glass G19 with the $B_2O_3$ content higher than 20.0% by weight.

Sample 232 decreased in Qf. This is assumed to be because of the use of the glass G32 with the MgO content lower than 0.1% by weight.

Sample 233 decreased in insulation reliability. This is assumed to be because of the use of the glass G33 with the MgO content higher than 5.5% by weight.

Sample 234 was not vitrified. This is assumed to be because of the use of the glass G34 with the $SiO_2$ content lower than 14.2% by weight.

Sample 235 decreased in insulation reliability. This is assumed to be because of the use of the glass G35 with the $Al_2O_3$ content lower than 0.5% by weight.

Sample 236 decreased in insulation reliability. This is assumed to be because of the use of the glass G36 with the $Al_2O_3$ content higher than 4.0% by weight.

The samples 202 to 204, 206, 207, 209 to 212, 214, 216, 218, and 220 to 231 listed in Tables 9 and 11, except for the samples 201, 205, 208, 213, 215, 217, 219, and 232 to 236, exhibited $\in_r$ of 30 or more, and achieved favorable results for Qf, β, and insulation reliability.

This is assumed to be because of the use of any one of the glasses G2, G3, G4, G6, G7, G9, G10, G11, G12, G14, G16, G18, G20, G21, G22, G23, G24, G25, G26, G27, G28, G29, G30, and G31 which satisfy the conditions of: the alkaline-earth metal content of 44.0 to 69.0% by weight; the $SiO_2$ content of 14.2 to 30.0% by weight; the $B_2O_3$ content of 10.0 to 20.0% by weight; the $Al_2O_3$ content of 0.5 to 4.0% by weight; the $Li_2O$ content of 0.3 to 7.5% by weight; and the MgO content of 0.1 to 5.5% by weight.

Next, the samples 237 to 273 shown in Tables 10 and 12 will be considered. For the samples 237 to 273, the respective contents of "Glass", "First Ceramic", "Second Ceramic", "MnO", and "CuO" were varied while the glass G22 shown in Table 1 was used as the "Glass".

Sample 237 decreased in insulation reliability. This is assumed to be because the BaO content was higher than 15.7% by weight in the second ceramic.

Sample 238 resulted in $\in_r$ less than 30. This is assumed to be because the BaO content was lower than 2.5% by weight in the second ceramic.

Sample 240 decreased in insulation reliability. This is assumed to be because the $TiO_2$ content was lower than 11.2% by weight in the second ceramic.

Sample 243 resulted in $\in_r$ less than 30. This is assumed to be because the $TiO_2$ content was higher than 36.4% by weight in the second ceramic.

Sample 245 was not sufficiently sintered. This is assumed to be because the content of $Nd_2O_3$ as $RE_2O_3$ was higher than 65.3% by weight in the second ceramic.

Sample 249 resulted in $\in_r$ less than 30. This is assumed to be because the content of $Nd_2O_3$ as $RE_2O_3$ was lower than 24.6% by weight in the second ceramic.

Sample 250 was not sufficiently sintered. This is assumed to be because the glass content was lower than 3% by weight.

Sample 255 decreased in insulation reliability. This is assumed to be because the glass content was higher than 15% by weight.

Samples 256 and 260 deteriorated in temperature coefficient of capacitance β. This is assumed to be because the content of $MgAl_2O_4$ or $Mg_2SiO_4$ as the first ceramic was higher than 15% by weight.

Samples 259 and 263 deteriorated in temperature coefficient of capacitance β. This is assumed to be because the content of $MgAl_2O_4$ or $Mg_2SiO_4$ as the first ceramic was lower than 1% by weight.

Sample 264 decreased in insulation reliability. This is assumed to be because the MnO content was lower than 2.3% by weight.

Sample 266 decreased in Qf. This is assumed to be because the MnO content was higher than 10% by weight.

Sample 270 decreased in insulation reliability. This is assumed to be because the CuO content was higher than 1.2% by weight.

The samples 239, 241, 242, 244, 246 to 248, 251 to 254, 257, 258, 261, 262, 265, 267 to 269, and 271 to 273 listed in Tables 10 and 12, except for the samples 237, 238, 240, 243, 245, 249, 250, 255, 256, 259, 260, 263, 264, 266, and 270 mentioned above, achieved favorable results for Qf, β, and insulation reliability.

This is assumed to be because of the satisfied conditions of: first ceramic content of 1 to 15% by weight; glass content of 3 to 15% by weight; MnO content of 2.3 to 10% by weight; BaO content of 2.5 to 15.7% by weight; $RE_2O_3$ content of 24.6 to 65.3% by weight; $TiO_2$ content of 11.2 to 36.4% by weight; and CuO content of 1.2% by weight or less.

It is to be noted that while $Nd_2O_3$ was used as $RE_2O_3$ in the second ceramic in Experimental Example 3, it has been confirmed that similar tendencies are also shown when other rare-earth elements are used, including $Sm_2O_3$.

Experimental Example 4

Figure 6:
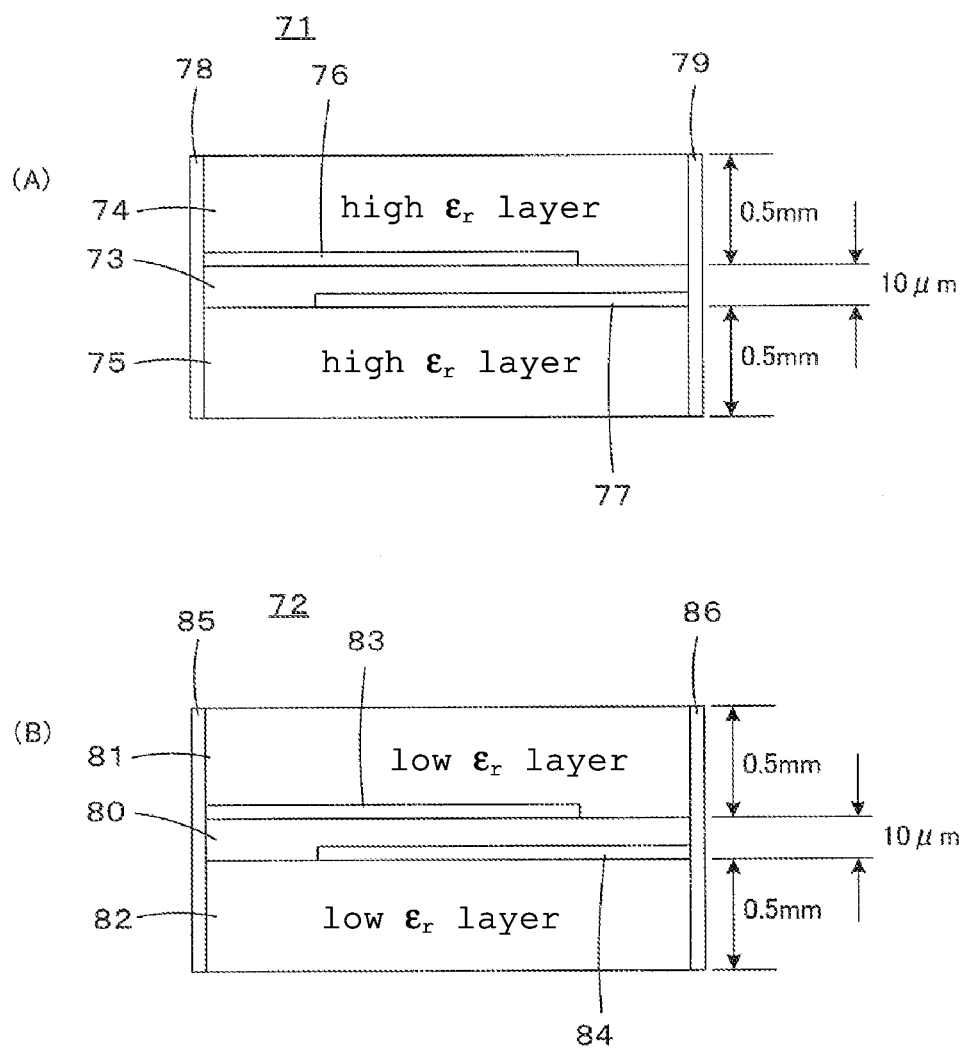
FIG. 6 is a cross-sectional view illustrating two types of co-sintered bodies prepared in an experimental example.

In Experimental Example 4, for each of a low dielectric constant ceramic layer and a high dielectric constant ceramic layer, the influences of a co-sintered body of these layers on the properties, in particular, on the relative permittivity $\in_r$ and temperature coefficient of capacitance β were examined. FIGS. 6(A) and 6(B) respectively show, in cross-sectional views, two types of co-sintered bodies 71 and 72 prepared in this experimental example.

The co-sintered body 71 shown in FIG. 6(A) was adapted to have a structure of a low dielectric constant ceramic layer 73 of 10 μm in thickness sandwiched between two high dielectric constant ceramic layers 74 and 75 of 0.5 mm in thickness. Internal electrodes 76 and 77 were respectively formed so as to be partially opposed to each other between the low dielectric constant ceramic layer 73 and the high dielectric constant ceramic layers 74 and 75, and external electrodes 78 and 79 electrically connected to the internal electrodes 76 and 77 respectively were formed on mutually-opposed end surfaces. The distance between the adjacent internal electrodes was 10 μm, and the electrode area was 4 mm□.

The co-sintered body 72 shown in FIG. 6(B), as an inversion of the co-sintered body 71 shown in FIG. 6(A) in terms of positional relationship between low dielectric constant ceramic layer and high dielectric constant layer, was adapted to have a structure of a high dielectric constant ceramic layer 80 of 10 μm in thickness sandwiched between two low dielectric constant ceramic layers 81 and 82 of 0.5 mm in thickness. Internal electrodes 83 and 84 were respectively formed so as to be partially opposed to each other between the high dielectric constant ceramic layer 80 and the low dielectric constant ceramic layers 81 and 82, and external electrodes 85 and 86 electrically connected to the internal electrodes 83 and 84 respectively were formed on mutually-opposed end surfaces.

The co-sintered bodies 71 and 72 were 10 mm×10 mm in planar dimension. In addition, the internal electrodes 76, 77, 83, and 84 as well as the external electrodes 78, 79, 85, and 86 were formed by printing a conductive paste containing Cu as a conductive component.

The co-sintered body 71 shown in FIG. 6(A) was used in the case of evaluating the properties of co-sintered bodies obtained with the low dielectric constant glass ceramics prepared in Experimental Examples 1 and 2 described previously, whereas the co-sintered body 72 shown in FIG. 6(B) was used in the case of evaluating the properties of co-sintered bodies obtained with the high dielectric constant glass ceramics prepared in Experimental Example 3.

When the relative permittivity $\in_r$ and temperature coefficient of capacitance β were obtained for each of the low dielectric constant ceramic layer 73 in the co-sintered body 71 and the high dielectric constant ceramic layer 80 in the co-sintered body 72, results were obtained which were equivalent to those in each case of the single low dielectric constant glass ceramic and the single high dielectric constant glass ceramic.

More specifically, the electrostatic capacitance value was measured at 1 MHz by an LCR meter, and the relative permittivity $\in_r$ was figured out with the following formula from the value and the area of and distance between the opposed electrodes.

$$\in_r = (d \times Cap)/(\in_0 \times S)$$

where d represents an inter-electrode distance [m], S represents an opposed electrode area [m$^2$], Cap represents electrostatic capacitance [F], and $\in_0$ represents a dielectric constant in vacuum (8.854×10$^{-12}$ [F/]).

In addition, the temperature coefficient of capacitance β was obtained by the same method as in the case of Experimental Example 1.

It is to be noted that while evaluations on Qf were not particularly made, the Qf is also assumed to be equivalent to those in the single cases, because the relative permittivity $\in_r$ and the temperature coefficient of capacitance β are equivalent as mentioned above.

Experimental Example 5

In Experimental Example 5, experiments were carried out for examining whether, in a co-sintered body with a low dielectric constant ceramic layer and a high dielectric constant ceramic layer, there are preferred ranges for the ratio $G_L/G_H$ between the content $G_L$ of glass contained in the low dielectric constant ceramic layer and the content $G_H$ of glass contained in the high dielectric constant ceramic layer, as well as the ratio $M_L/M_H$ between the content $M_L$ of MnO contained in the low dielectric constant ceramic layer and the content $M_H$ of MnO contained in the high dielectric constant ceramic layer, and if any, for examining which ranges are preferred.

In order to obtain samples with the ratio $G_L/G_H$ and ratio $M_L/M_H$ varied variously, the low dielectric constant glass ceramics listed in Table 3 with the sample numbers listed in the column "Low Dielectric constant Layer Sample Number" of Table 13 were combined with the high dielectric constant glass ceramics listed in Table 10 with the sample numbers listed in the column "High Dielectric constant Sample Number" of Table 13 to prepare the co-sintered bodies 71 and 72 respectively as shown in FIGS. 6(A) and 6(B).

In the respective columns "$G_L/G_H$" and "$M_L/M_H$" of Table 13, the ratio $G_L/G_H$ and the ratio $M_L/M_H$ are each shown for the combined low dielectric constant glass ceramic and high dielectric constant glass ceramic.

In this experimental example, the co-sintered body 71 shown in FIG. 6(A) was used to evaluate the low dielectric constant glass ceramics for insulation reliability, whereas the co-sintered body 72 shown in FIG. 6(B) was used to evaluate the high dielectric constant glass ceramics for insulation reliability.

For the evaluation of insulation reliability, a test was carried out in which each voltage of DC 200 V, 100 V, and 50 V was applied for 100 hours between the external electrodes 78 and 79 of the co-sintered body 71 or between the external electrodes 85 and 86 of the co-sintered body 72 under a temperature of 150° C. The insulation resistance after the test was measured, and a failure was determined when this log(IR [Ω]) after the test was less than 11.

The insulation reliability of the low dielectric constant ceramic layer is shown in the column "Low Dielectric constant Reliability" of Table 13, whereas the insulation reliability of the high dielectric constant ceramic layer is shown in the column "High Dielectric constant Reliability" thereof, and the reliability is denoted by "⊙" in the case of no insulation resistance degradation observed even at the applied voltage of 200 V, denoted by "○" in the case of degradation observed at 200 V but no degradation observed at 100 V, or denoted by "Δ" in the case of degradation observed at 200 V and 100 V but no degradation observed at 50 V.

TABLE 13

| Sample Number | Low Dielectric Constant Layer Sample Number | High Dielectric Constant Layer Sample Number | $G_L/G_H$ | $M_L/M_H$ | Low Dielectric Constant Reliability | High Dielectric Constant Reliability |
| --- | --- | --- | --- | --- | --- | --- |
| 301 | 60 | 253 | 0.83 | 3.57 | Δ | ○ |
| 302 | 53 | 254 | 1 | 4.29 | ○ | Δ |
| 303 | 60 | 252 | 1.25 | 3.57 | ○ | ○ |
| 304 | 60 | 268 | 2 | 3.57 | ○ | ○ |
| 305 | 62 | 252 | 2.5 | 6.43 | Δ | Δ |
| 306 | 71 | 271 | 3.1 | 1.19 | Δ | Δ |
| 307 | 56 | 271 | 2.4 | 1.5 | Δ | ○ |
| 308 | 71 | 239 | 3.1 | 2.5 | Δ | ○ |
| 309 | 51 | 239 | 2.4 | 3.55 | Δ | ○ |
| 310 | 63 | 239 | 2.6 | 3.95 | Δ | Δ |
| 311 | 53 | 272 | 1.88 | 2.4 | ⊙ | ⊙ |
| 312 | 56 | 272 | 1.5 | 2.4 | ⊙ | ⊙ |
| 313 | 59 | 272 | 1.63 | 3 | ⊙ | ⊙ |
| 314 | 53 | 273 | 1.25 | 1.71 | ⊙ | ⊙ |
| 315 | 56 | 273 | 1 | 1.71 | ⊙ | ⊙ |
| 316 | 59 | 273 | 1.08 | 2.14 | ⊙ | ⊙ |

In Table 13, first, when attention is drawn to the "$G_L/G_H$", the samples 302 to 304 and 311 to 316 which satisfy the condition of 1.0≤$G_L/G_H$≤2.0 are evaluated with "○" or "⊙", in particular, for "Low Dielectric constant Reliability".

Next, when attention is drawn to "$M_L/M_H$", the samples 301, 303, 304, 307 to 309 and 311 to 316 which satisfy the condition of $1.5 \leq M_L/M_H \leq 3.6$ are evaluated with "◯" or "◉", in particular, for "High Dielectric constant Reliability".

Furthermore, the samples 311 to 316 which satisfy both the condition of $1.0 \leq G_L/G_H \leq 2.0$ and the condition of $1.5 \leq M_L/M_H \leq 3.6$ are evaluated with "◉" for both "Low Dielectric constant Reliability" and "High Dielectric constant Reliability".

Experimental Example 6

In Experimental Example 6, the influences of the ratio $G_L/G_H$ between the glass contents and of the ratio $M_L/M_H$ between the MnO contents in a co-sintered body on the insulation reliability were examined as in the case of Experimental Example 5, and the warpage suppressing effect was examined in the case of the low dielectric constant ceramic layer further containing at least one of $Mg_2Al_4Si_5O_{18}$ and $BaAl_2Si_2O_8$.

In Experimental Example 2 described previously, the influences on the low dielectric constant glass ceramics were also examined by the addition of at least one of $Mg_2Al_4Si_5O_{18}$ and $BaAl_2Si_2O_8$. As a result, it has been found that the relative permittivity ($\in_r$) can be further reduced, and the temperature coefficient of capacitance ($\beta$) is also improved.

In this Experimental Example 6, samples 401 to 413 of compositions as listed in Table 14 below, which are different from the samples 101 to 113 shown in Tables 6 and 7 in Experimental Example 2, were prepared by the same method as in the case of Experimental Example 2.

TABLE 14

| Sample Number | Glass Symbol | Glass (% by weight) | First Ceramic (% by weight) MgAl₂O₄ | First Ceramic (% by weight) Mg₂SiO₄ | Second Ceramic (% by weight) BaO (% by weight) | Second Ceramic (% by weight) TiO₂ (% by weight) | Second Ceramic (% by weight) Nd₂O₃ (% by weight) | Second Ceramic (% by weight) MnO (% by weight) | Second Ceramic (% by weight) CuO (% by weight) | Second Ceramic (% by weight) Mg₂Al₄Si₅O₁₈ (% by weight) | Second Ceramic (% by weight) BaAl₂Si₂O₈ (% by weight) |
|---|---|---|---|---|---|---|---|---|---|---|---|
| 401 | G22 | 10.00 | 0 | 68.92 | 0.80 | 3.80 | 5.40 | 11.00 | 0.08 | 0.00 | 0.00 |
| 402 | G22 | 10.00 | 0 | 48.92 | 0.80 | 3.80 | 5.40 | 11.00 | 0.08 | 10.00 | 10.00 |
| 403 | G3  | 10.00 | 0 | 66.92 | 0.80 | 3.80 | 5.40 | 11.00 | 0.08 | 2.00 | 0.00 |
| 404 | G10 | 10.00 | 0 | 65.92 | 0.80 | 3.80 | 5.40 | 11.00 | 0.08 | 3.00 | 0.00 |
| 405 | G18 | 10.00 | 0 | 58.92 | 0.80 | 3.80 | 5.40 | 11.00 | 0.08 | 10.00 | 0.00 |
| 406 | G22 | 10.00 | 0 | 48.92 | 0.80 | 3.80 | 5.40 | 11.00 | 0.08 | 20.00 | 0.00 |
| 407 | G24 | 10.00 | 0 | 47.92 | 0.80 | 3.80 | 5.40 | 11.00 | 0.08 | 21.00 | 0.00 |
| 408 | G3  | 10.00 | 0 | 66.92 | 0.80 | 3.80 | 5.40 | 11.00 | 0.08 | 0.00 | 2.00 |
| 409 | G10 | 10.00 | 0 | 65.92 | 0.80 | 3.80 | 5.40 | 11.00 | 0.08 | 0.00 | 3.00 |
| 410 | G18 | 10.00 | 0 | 58.92 | 0.80 | 3.80 | 5.40 | 11.00 | 0.08 | 0.00 | 10.00 |
| 411 | G22 | 10.00 | 0 | 48.92 | 0.80 | 3.80 | 5.40 | 11.00 | 0.08 | 0.00 | 20.00 |
| 412 | G24 | 10.00 | 0 | 47.92 | 0.80 | 3.80 | 5.40 | 11.00 | 0.08 | 0.00 | 21.00 |
| 413 | G16 | 10.00 | 0 | 58.92 | 0.80 | 3.80 | 5.40 | 11.00 | 0.08 | 6.00 | 4.00 |

Then, the properties of the low dielectric constant glass ceramic themselves according to each of the samples 101 to 113 were evaluated in the same manner as in the case of Experimental Example 2. The results are shown in Table 15.

TABLE 15

| Sample Number | $\in_r$ | Qf (GHz) | β (ppm/K) | Insulation Reliability |
|---|---|---|---|---|
| 401 | 9 | 6500 | 100 | ◯ |
| 402 | 6 | 8678 | 74 | ◯ |
| 403 | 9 | 6915 | 93 | ◯ |
| 404 | 8 | 7186 | 72 | ◯ |
| 405 | 7 | 7322 | 64 | ◯ |
| 406 | 6 | 6915 | 62 | ◯ |
| 407 | 6 | 5559 | 54 | ◯ |
| 408 | 9 | 6915 | 85 | ◯ |
| 409 | 8 | 6915 | 72 | ◯ |
| 410 | 8 | 7186 | 66 | ◯ |
| 411 | 7 | 7322 | 64 | ◯ |
| 412 | 7 | 5288 | 54 | ◯ |
| 413 | 7 | 7186 | 67 | ◯ |

In Table 15, there is a tendency similar to that in the case of Experimental Example 2 described previously.

More specifically, in comparison between the samples 402, 404 to 407, and 409 to 413 containing 3.0% by weight or more of at least one of $Mg_2Al_4Si_5O_{18}$ and $BaAl_2Si_2O_8$, and the samples 401, 403, and 408 containing none of them, the former achieves lower $\in_r$, such as 8 or less, and also results in a temperature coefficient of capacitance β less than 100 ppm/K in terms of absolute value.

On the other hand, in the case of the samples 407 and 412 containing more than 20.0% by weight of at least one of $Mg_2Al_4Si_5O_{18}$ and $BaAl_2Si_2O_8$, decreases in Qf were observed.

Next, the low dielectric constant glass ceramics listed in Table 14 were combined with the high dielectric constant glass ceramics listed in Table 10 shown previously in the same manner as in the case of Experimental Example 5 as shown in Table 16, to obtain co-sintered bodies according to samples 501 to 513 with the variously varied ratio $G_L/G_H$ between glass contents and ratio $M_L/M_H$ between MnO contents.

Next, in the same manner as in the case of Experimental Example 5, the "Low Dielectric constant Reliability" and "High Dielectric constant Reliability" were evaluated as shown in Table 16.

In this Experimental Example 6, "warpage" was further evaluated as shown in Table 16. As for the "warpage", a composite substrate of 50 mm×50 mm in planar dimension and 1 mm in thickness was prepared by stacking a low dielectric constant ceramic layer of 0.5 mm in thickness and a high dielectric constant ceramic layer of 0.5 mm in thickness, and placed on a surface plate to measure the level of the highest point, and the value obtained by subtracting the thickness of the composite substrate from the level was obtained as the warpage amount. The sintered body with the warpage amount of 0.1 mm or less was determined as a pass, which is denoted by "○" in the column "Warpage" of Table 16, whereas the sintered body with the warpage amount in excess of 0.1 mm was determined as a failure, which is denoted by "X" in the column.

TABLE 16

| Sample Number | Low Dielectric Constant Layer Sample Number | High Dielectric Constant Layer Sample Number | $G_L/G_H$ | $M_L/M_H$ | Low Dielectric Constant Reliability | High Dielectric Constant Reliability | Warpage |
|---|---|---|---|---|---|---|---|
| 501 | 401 | 258 | 2.0 | 3.9 | ○ | Δ | X |
| 502 | 402 | 265 | 2.0 | 3.9 | ○ | Δ | ○ |
| 503 | 403 | 252 | 1.3 | 3.9 | ○ | Δ | X |
| 504 | 404 | 253 | 0.8 | 3.9 | Δ | Δ | ○ |
| 505 | 405 | 271 | 2.0 | 1.4 | ○ | Δ | ○ |
| 506 | 406 | 272 | 1.3 | 2.2 | ⊙ | ⊙ | ○ |
| 507 | 407 | 273 | 0.8 | 1.6 | Δ | ○ | X |
| 508 | 408 | 252 | 1.3 | 3.9 | ○ | Δ | X |
| 509 | 409 | 253 | 0.8 | 3.9 | Δ | Δ | ○ |
| 510 | 410 | 271 | 2.0 | 1.4 | ○ | Δ | ○ |
| 511 | 411 | 272 | 1.3 | 2.2 | ⊙ | ⊙ | ○ |
| 512 | 412 | 273 | 0.8 | 1.6 | Δ | ○ | X |
| 513 | 413 | 268 | 2.0 | 3.9 | ○ | Δ | ○ |

In terms of "Low Dielectric constant Reliability" and "High Dielectric constant Reliability" of Table 16, there is a tendency similar to that in the case of Experimental Example 5.

More specifically, in Table 16, first, when attention is drawn to the "$G_L/G_H$", the samples 501 to 503, 505, 506, 508, 510, 511, and 513 which satisfy the condition of $1.0 \leq G_L/G_H \leq 2.0$ are evaluated with "○" or "⊙", in particular, for "Low Dielectric constant Reliability".

Next, when attention is drawn to "$M_L/M_H$", the samples 506, 507, 511, and 512 which satisfy the condition of $1.5 \leq M_L/M_H \leq 3.6$ are evaluated with "○" or "⊙", in particular, for "High Dielectric constant Reliability".

Furthermore, the samples 506 and 511 which satisfy both the condition of $1.0 \leq G_L/G_H \leq 2.0$ and the condition of $1.5 \leq M_L/M_H \leq 3.6$ are evaluated with "⊙" for both "Low Dielectric constant Reliability" and "High Dielectric constant Reliability".

Next, as for the "warpage", the evaluation of "○" was achieved with the samples 502, 504 to 506, 509 to 511, and 513 using the low dielectric constant glass ceramics according to the samples 402, 404 to 406, 409 to 411, and 413 in Table 14 further containing 3.0 to 20.0% by weight of at least one of $Mg_2Al_2Si_5O_{15}$ and $BaAl_2Si_2O_8$ in the "low dielectric constant layer".

DESCRIPTION OF REFERENCE SYMBOLS

1 ceramic multilayer module
2 multilayer ceramic substrate
3, 73, 81, 82 low dielectric constant ceramic layer
4, 74, 75, 80 high dielectric constant ceramic layer
21 LC filter
23 component body
28 to 32, 35 to 40 low dielectric constant ceramic layer
33, 34 high dielectric constant ceramic layer
71, 72 co-sintered body

The invention claimed is:

1. A composite laminate ceramic electronic component comprising:

a first ceramic layer; and
a second ceramic layer adjacent the first ceramic layer, wherein the first ceramic layer has a lower dielectric constant than that of the second ceramic layer,
wherein the first ceramic layer and the second ceramic layer each comprise a glass ceramic containing:
(1) a first ceramic comprising at least one of $MgAl_2O_4$ and $Mg_2SiO_4$;
(2) a second ceramic comprising BaO, $RE_2O_3$, and $TiO_2$;
(3) glass containing each of 44.0 to 69.0% by weight of RO, 14.2 to 30.0% by weight of $SiO_2$, 10.0 to 20.0% by weight of $B_2O_3$, 0.5 to 4.0% by weight of $Al_2O_3$, 0.3 to 7.5% by weight of $Li_2O$, and 0.1 to 5.5% by weight of MgO; and
(4) MnO,
wherein RE is a rare-earth element, and R is at least one alkaline-earth metal selected from Ba, Ca, and Sr,
wherein the first ceramic layer
contains 47.55 to 69.32% by weight of the first ceramic;
contains 6 to 20% by weight of the glass;
contains 7.5 to 18.5% by weight of the MnO; and
contains, as the second ceramic, each of 0.38 to 1.43% by weight of BaO, 1.33 to 9.5% by weight of $RE_2O_3$, and 0.95 to 6.75% by weight of $TiO_2$, and
has a relative permittivity of 15 or less, and wherein the second ceramic layer
contains 1 to 15% by weight of the first ceramic;
contains 3 to 15% by weight of the glass;
contains 2.3 to 10% by weight of the MnO, and
contains, as the second ceramic, each of 2.5 to 15.7% by weight of BaO, 24.6 to 65.3% by weight of $RE_2O_3$, and 11.2 to 36.4% by weight of $TiO_2$, and
has a relative permittivity of 30 or more.

2. The composite laminate ceramic electronic component according to claim 1, wherein a content $G_L$ of the glass contained in the first ceramic layer and a content $G_H$ of the glass contained in the second ceramic layer satisfy a condition of $1.0 \leq G_L/G_H \leq 2.0$.

3. The composite laminate ceramic electronic component according to claim 2, wherein the first ceramic layer further contains 3.0 to 20.0% by weight of at least one of $Mg_2Al_4Si_5O_{18}$ and $BaAl_2Si_2O_8$.

4. The composite laminate ceramic electronic component according to claim 2, wherein the first ceramic layer further contains 0.23% by weight or less of CuO.

5. The composite laminate ceramic electronic component according to claim 4, wherein the second ceramic layer further contains 1.2% by weight or less of CuO.

6. The composite laminate ceramic electronic component according to claim 2, wherein the second ceramic layer further contains 1.2% by weight or less of CuO.

7. The composite laminate ceramic electronic component according to claim 1, wherein a content $M_L$ of the MnO contained in the first ceramic layer and a content $M_H$ of the MnO contained in the second ceramic layer satisfy a condition of $1.5 \leq M_L/M_H \leq 3.6$.

8. The composite laminate ceramic electronic component according to claim 7, wherein the first ceramic layer further contains 3.0 to 20.0% by weight of at least one of $Mg_2Al_4Si_5O_{18}$ and $BaAl_2Si_2O_8$.

9. The composite laminate ceramic electronic component according to claim 7, wherein the first ceramic layer further contains 0.23% by weight or less of CuO.

10. The composite laminate ceramic electronic component according to claim 9, wherein the second ceramic layer further contains 1.2% by weight or less of CuO.

11. The composite laminate ceramic electronic component according to claim 7, wherein the second ceramic layer further contains 1.2% by weight or less of CuO.

12. The composite laminate ceramic electronic component according to claim 1,
wherein a content $G_L$ of the glass contained in the first ceramic layer and a content $G_H$ of the glass contained in the second ceramic layer satisfy a condition of $1.0 \leq G_L/G_H \leq 2.0$, and
a content $M_L$ of the MnO contained in the first ceramic layer and a content $M_H$ of the MnO contained in the second ceramic layer satisfy a condition of $1.5 \leq M_L/M_H \leq 3.6$.

13. The composite laminate ceramic electronic component according to claim 12, wherein the first ceramic layer further contains 3.0 to 20.0% by weight of at least one of $Mg_2Al_4Si_5O_{18}$ and $BaAl_2Si_2O_8$.

14. The composite laminate ceramic electronic component according to claim 12, wherein the first ceramic layer further contains 0.23% by weight or less of CuO.

15. The composite laminate ceramic electronic component according to claim 14, wherein the second ceramic layer further contains 1.2% by weight or less of CuO.

16. The composite laminate ceramic electronic component according to claim 12, wherein the second ceramic layer further contains 1.2% by weight or less of CuO.

17. The composite laminate ceramic electronic component according to claim 1, wherein the first ceramic layer further contains 3.0 to 20.0% by weight of at least one of $Mg_2Al_4Si_5O_{18}$ and $BaAl_2Si_2O_8$.

18. The composite laminate ceramic electronic component according to claim 1, wherein the first ceramic layer further contains 0.23% by weight or less of CuO.

19. The composite laminate ceramic electronic component according to claim 6, wherein the second ceramic layer further contains 1.2% by weight or less of CuO.

20. The composite laminate ceramic electronic component according to claim 1, wherein the second ceramic layer further contains 1.2% by weight or less of CuO.

* * * * *